(12) United States Patent
Ding et al.

(10) Patent No.: US 12,046,001 B2
(45) Date of Patent: Jul. 23, 2024

(54) VISUAL LOCALIZATION METHOD, TERMINAL, AND SERVER

(71) Applicant: HUAWEI TECHNOLOGIES CO., LTD., Guangdong (CN)

(72) Inventors: Ran Ding, Beijing (CN); Yan Zhou, Wuhan (CN); Yongliang Wang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 341 days.

(21) Appl. No.: 17/667,122

(22) Filed: Feb. 8, 2022

(65) Prior Publication Data

US 2022/0156969 A1     May 19, 2022

Related U.S. Application Data

(63) Continuation of application No. PCT/CN2020/107364, filed on Aug. 6, 2020.

(30) Foreign Application Priority Data

Aug. 9, 2019    (CN) .......................... 201910736244.9

(51) Int. Cl.
     *G06K 9/00*          (2022.01)
     *G06T 7/50*           (2017.01)
     (Continued)

(52) U.S. Cl.
     CPC ................. *G06T 7/73* (2017.01); *G06T 7/50* (2017.01); *G06V 10/44* (2022.01); *G06V 20/176* (2022.01)

(58) Field of Classification Search
     CPC ................................... G06T 7/73; G06T 7/50
     See application file for complete search history.

(56) References Cited

U.S. PATENT DOCUMENTS

| | | | |
|---|---|---|---|
| 2010/0201082 A1* | 8/2010 | Hart | ........................ B32B 15/20 277/654 |
| 2011/0242319 A1 | 10/2011 | Miyajima | |
| (Continued) | | | |

FOREIGN PATENT DOCUMENTS

| | | | |
|---|---|---|---|
| CN | 101114337 A | | 1/2008 |
| CN | 103139700 A | * | 6/2013 |
| (Continued) | | | |

OTHER PUBLICATIONS

Orientation Descriptors for Localization in Urban Environments, Philip David et al., IEEE, 2011, pp. 494-501 (Year: 2011).*

(Continued)

*Primary Examiner* — Jayesh A Patel
(74) *Attorney, Agent, or Firm* — Fish & Richardson P.C.

(57) ABSTRACT

The disclosure provides example visual localization methods. One method includes that a terminal device obtains an image of a building. The terminal device generates a descriptor based on the image. The descriptor includes information about a horizontal viewing angle between a first vertical feature line and a second vertical feature line in the image. The first vertical feature line indicates a first facade intersection line of the building, and the second vertical feature line indicates a second facade intersection line of the building. The terminal device performs matching in a preset descriptor database based on the descriptor, to obtain localization information of a photographing place of the image.

20 Claims, 13 Drawing Sheets

(51) Int. Cl.
*G06T 7/73* (2017.01)
*G06V 10/44* (2022.01)
*G06V 20/10* (2022.01)

(56) References Cited

U.S. PATENT DOCUMENTS

| | | | |
|---|---|---|---|
| 2012/0041722 A1* | 2/2012 | Quan | G06T 7/579 |
| | | | 703/1 |
| 2012/0206438 A1* | 8/2012 | Porikli | G06V 20/653 |
| | | | 345/419 |
| 2012/0314935 A1 | 12/2012 | Cheng et al. | |
| 2013/0166202 A1 | 6/2013 | Bandyopadhyay et al. | |
| 2013/0223683 A1* | 8/2013 | Jiang | G06V 10/457 |
| | | | 382/103 |
| 2013/0243250 A1 | 9/2013 | France et al. | |
| 2015/0243080 A1* | 8/2015 | Steinbach | G06T 7/50 |
| | | | 345/633 |
| 2015/0244935 A1* | 8/2015 | Meier | G06V 20/20 |
| | | | 348/372 |
| 2017/0124713 A1* | 5/2017 | Jurgenson | G06T 7/20 |
| 2017/0301104 A1* | 10/2017 | Qian | G06F 16/583 |
| 2019/0005069 A1* | 1/2019 | Filgueiras de Araujo | |
| | | | G06V 10/757 |
| 2019/0065855 A1 | 2/2019 | Lerman | |

FOREIGN PATENT DOCUMENTS

| | | | | |
|---|---|---|---|---|
| CN | 103139700 A | | 6/2013 | |
| CN | 103295186 A | * | 9/2013 | ........... G06K 9/4638 |
| CN | 104573735 A | * | 4/2015 | |
| CN | 104573735 A | | 4/2015 | |
| CN | 107742311 A | | 2/2018 | |
| CN | 107924590 A | | 4/2018 | |
| CN | 109059941 A | | 12/2018 | |
| CN | 109614859 A | | 4/2019 | |
| CN | 109661659 A | | 4/2019 | |
| JP | 2006119797 A | | 5/2006 | |
| JP | 2006242731 A | | 9/2006 | |
| JP | 2009229180 A | | 10/2009 | |
| JP | 2009271650 A | | 11/2009 | |
| JP | 2009271650 A | * | 11/2009 | |
| JP | 2015108992 A | | 6/2015 | |

OTHER PUBLICATIONS

Urban-Area and Building Detection Using SIFT Keypoints and Graph Theory, Beril Srmacek et al., IEEE, 2009, pp. 1156-1167 (Year: 2009).*
Combined Feature Extraction for Façade Reconstruction, Susanne Becker et al., ISPRS, 2007, pp. 44-49 (Year: 2007).*
Building Façade Recognition Using Oblique Aerial Images, Xiucheng Yang et al., Remote Sens, 2015, pp. 10562-10588 (Year: 2015).*
2D Matching Using Repetitive and Salient Features in Architectural Images, Brittany Morago et al., IEEE, 2016, pp. 4888-4899 (Year: 2016).*
Robust Matching of Building Facades under Large Viewpoint Changes, Jimmy Addison Lee et al, IEEE, 2009, pp. 1258-1264 (Year: 2009).*
Localization Based on Building Recognition, Wei Zhang et al., IEEE, 2005, pp. 1-8 (Year: 2005).*
Extraction of buildings and trees in urban environments, Norbert Haala et al., ELSEVIER, 1999, pp. 130-137 (Year: 1999).*
PCT International Search Report and Written Opinion issued in International Application No. PCT/CN2020/107364 on Nov. 3, 2020, 18 pages (with English translation).

* cited by examiner

VISUAL LOCALIZATION METHOD, TERMINAL, AND SERVER

CROSS-REFERENCE TO RELATED APPLICATIONS

This application is a continuation of International Application No. PCT/CN2020/107364, filed on Aug. 6, 2020, which claims priority to Chinese Patent Application No. 201910736244.9, filed on Aug. 9, 2019. The disclosures of the aforementioned applications are hereby incorporated by reference in their entireties.

TECHNICAL FIELD

This application relates to the field of localization technologies, and in particular, to a visual localization method, a terminal, and a server.

BACKGROUND

With gradual development of communications technologies and improvement of terminal hardware computing capabilities, requirements of an outdoor location-based service (LBS) are increasingly abundant, for example, enhanced navigation, augmented reality (AR) advertising, and AR gaming. An outdoor localization technology mainly depends on a global positioning system (GPS). A GPS signal is prone to blockage and multipath reflection due to impact of buildings, and localization precision is low. However, in visual localization, image information of a current scenario is obtained to perform more accurate localization.

To meet a requirement of an LBS for localization precision, in a conventional technology, a large quantity of images are pre-captured, feature points are extracted based on a luminance change of image pixels, to construct a three-dimensional spatial map of a scenario, where the map includes three-dimensional spatial locations of the feature points and descriptors corresponding to the feature points. A descriptor of a feature point is used to describe a relationship between the feature point and a surrounding pixel. During visual localization, a current photographed image is input, feature points of the image are first extracted, and then matching between the feature points in the image and the feature points on the map is performed, to obtain a visual localization result.

However, in the conventional technology, the feature points are extracted based on the luminance change of the image pixels, and matching between the feature points extracted from the current photographed image and the feature points extracted from the image captured when the database is constructed is performed. Therefore, if there is a great change between a scenario in which the current image is photographed and a scenario in which the image is captured for the database, for example, if an illumination condition changes greatly or it is rainy or snowy, the extracted feature points cannot be matched effectively. As a result, the precision of the visual localization result is low.

SUMMARY

Embodiments of this application provide a visual localization method, to implement localization with high precision when an image photographing scenario changes greatly.

A first aspect of the embodiments of this application provides a visual localization method. The method includes: A terminal obtains an image of a building. The terminal generates a descriptor based on the image. The descriptor includes information about a horizontal viewing angle between a first vertical feature line and a second vertical feature line in the image, the first vertical feature line indicates a first facade intersection line of the building, and the second vertical feature line indicates a second facade intersection line of the building. The terminal performs matching in a preset descriptor database based on the descriptor, to obtain localization information of a photographing place of the image. The preset descriptor database includes geographical locations of candidate points and descriptors of the candidate points. The descriptor of the candidate point includes orientation information of a visible facade intersection line of a surrounding building by using the candidate point as a viewpoint, and a geographical location of a candidate point indicated by a descriptor that is in the preset descriptor database and that matches the descriptor of the image is the localization information of the photographing place of the image.

During visual localization, a user may use a photographed image to obtain localization information of a photographing place of the current image. In this embodiment of this application, the terminal may obtain the image of the building by photographing the building. The terminal may generate, based on the image, the descriptor corresponding to the image. The descriptor is used to indicate a spatial location relationship between a photographing place of the image and a facade intersection line of the photographed building, the descriptor includes the information about the horizontal viewing angle between the first vertical feature line and the second vertical feature line in the image, the first vertical feature line indicates the first facade intersection line of the building, and the second vertical feature line indicates the second facade intersection line of the building. The terminal performs matching in the preset descriptor database based on the descriptor, to obtain the localization information of the photographing place of the image. The preset descriptor database includes the geographical locations of candidate points and the descriptors of the candidate points. The candidate point is a pre-selected point in a known geographical location, and is used as a reference point to collect orientation information of a visible facade intersection line of a surrounding building, and includes information about a horizontal viewing angle between any two facade intersection lines by using the candidate point as a viewpoint. Therefore, matching is performed between the descriptor obtained from the image and the descriptor of the candidate point, to determine a descriptor of a candidate point with a high matching degree, and a geographical location of the corresponding descriptor may be used to determine the localization information of the photographing place of the image.

In a possible implementation of the first aspect, that a terminal generates a descriptor based on the image includes: The terminal extracts the first vertical feature line and the second vertical feature line of the building from the image. The terminal generates the descriptor based on a location relationship between the first vertical feature line and the second vertical feature line. The location relationship includes the information about the horizontal viewing angle between the first vertical feature line and the second vertical feature line.

According to the visual localization method provided in this embodiment of this application, the terminal may extract the first vertical feature line and the second vertical feature line of the building from the image, to generate the descriptor.

In a possible implementation of the first aspect, the descriptor includes height information and/or depth information of the first vertical feature line, and height information and/or depth information of the second vertical feature line. The height information of the first vertical feature line is used to indicate a height of the first facade intersection line, the height information of the second vertical feature line is used to indicate a height of the second facade intersection line, the depth information of the first vertical feature line is used to indicate a distance from the photographing place of the image to the first facade intersection line, and the depth information of the second vertical feature line is used to indicate a distance from the photographing place of the image to the second facade intersection line.

According to the visual localization method provided in this embodiment of this application, the descriptor may further include height information and/or depth information of a vertical feature line. The height information of the vertical feature line is used to indicate a height of a facade intersection line of the building, and the depth information of the vertical feature line is used to indicate a distance from the photographing place of the image to the facade intersection line. Therefore, in addition to the information about the horizontal viewing angle between the first vertical feature line and the second vertical feature line in the image, the descriptor may further include more abundant location information about the facade intersection line of the building. The height information and the depth information may also be used for matching and localization. For example, when facade intersection lines of buildings around the photographing place are uniform, if the height information of the facade intersection lines is also included, localization precision may be improved, and orientation information during image photographing may be further provided.

In a possible implementation of the first aspect, the descriptor is expressed by using a ring array. The ring array includes first data indicating the first vertical feature line and second data indicating the second vertical feature line, and a location spacing between the first data and the second data in the ring array is used to indicate the information about the horizontal viewing angle between the first vertical feature line and the second vertical feature line.

According to the visual localization method provided in this embodiment of this application, a specific storage form of the descriptor is provided, that is, the ring array. Angle information without a specific orientation may be conveniently expressed by using a feature spacing, and matching with the descriptor database may be further facilitated.

In a possible implementation of the first aspect, the descriptor is expressed by using the ring array. The ring array includes the first data, the second data, and third data. The third data is used to indicate that no vertical feature line of the building appears.

According to the visual localization method provided in this embodiment of this application, another specific storage form of the descriptor is provided. The ring array includes data corresponding to each vertical feature line and the third data indicating that no vertical feature line of the building appears. This improves implementability of the solution.

In a possible implementation of the first aspect, the first data includes the height information and/or the depth information of the first vertical feature line, and the second data includes the height information and/or the depth information of the second vertical feature line.

According to the visual localization method provided in this embodiment of this application, another specific storage form of the descriptor is provided. The first data of the ring array may further include height information and/or depth information, and a specific manner of implementing storage of the height information and/or the depth information is provided.

In a possible implementation of the first aspect, the descriptor is expressed by using a circle, a first feature point that is on the circle and that indicates the first vertical feature line, and a second feature point that is on the circle and that indicates the second vertical feature line. The circle uses an optical center corresponding to the image as a circle center. The first feature point is a point obtained by projecting the first vertical feature line onto a cylinder that uses a gravity axis passing through the optical center as an axis, and then projecting the first vertical feature line onto a horizontal plane including the optical center. The second feature point is a point obtained by projecting the second vertical feature line onto the cylinder, and then projecting the second vertical feature line onto the horizontal plane. An included angle between a connection line between the first feature point and the circle center, and a connection line between the second feature point and the circle center is used to indicate the information about the horizontal viewing angle.

According to the visual localization method provided in this embodiment of this application, the descriptor may be expressed by using intuitive geometric information, so that a descriptor generation manner may be conveniently displayed, and a specific process of visual localization is reflected. This improves interaction experience.

In a possible implementation of the first aspect, the method further includes: The terminal obtains first localization information. The first localization information includes localization information obtained based on a GPS signal, a Wi-Fi signal, location information of a base station serving the terminal, or localization information obtained by manually entering an address by a user. That the terminal performs matching in a preset descriptor database based on the descriptor, to obtain localization information of a photographing place of the image includes: The terminal performs matching in a first descriptor database based on the descriptor, to obtain the localization information. The first descriptor database includes a geographical location of a first candidate point and a descriptor of the first candidate point, and the first candidate point is a candidate point whose geographical location falls within a first location range corresponding to the first localization information.

According to the visual localization method provided in this embodiment of this application, the terminal may obtain the rough first location range based on the first localization information. In this case, a matching range of the descriptor database is narrowed. Matching is performed only based on descriptors of candidate points that fall within the first location range. This can reduce a calculation amount and can increase a visual localization speed.

In a possible implementation of the first aspect, the method further includes: The terminal obtains the first localization information. The first localization information includes the localization information obtained based on the GPS signal, the Wi-Fi signal, the location information of the base station serving the terminal, or the localization information obtained by manually entering the address by the user. The terminal sends the first localization information to a server. The terminal receives the preset descriptor database sent by the server. The preset descriptor database includes the geographical location of the first candidate point and the descriptor of the first candidate point, and the first candidate point is the candidate point whose geographical location falls within the first location range corresponding to the first localization information.

According to the visual localization method provided in this embodiment of this application, the terminal may send the first localization information to the server, and obtain the preset descriptor database from the server, to implement local matching and localization.

In a possible implementation of the first aspect, the method further includes: The terminal obtains photographing orientation information of the image. That the terminal performs matching in a preset descriptor database based on the descriptor, to obtain localization information of a photographing place of the image includes: The terminal performs matching in the preset descriptor database based on the descriptor and a first angle range determined by using the photographing orientation information, to obtain the localization information.

According to the visual localization method provided in this embodiment of this application, the terminal may obtain the photographing orientation information of the image, and perform matching with a descriptor of a candidate point within an angle range restricted by the orientation information. This can reduce a calculation amount and can increase a visual localization speed.

In a possible implementation of the first aspect, that a terminal obtains an image of a building includes: The terminal obtains a first image photographed in a first place and a second image photographed in a second place. The first place and the second place are a same place, or a distance between the first place and the second place is less than a preset threshold, and the first image and the second image include partially overlapping image information.

According to the visual localization method provided in this embodiment of this application, the terminal may widen a field of view by photographing a plurality of images, to obtain image information of more buildings. The first image and the second image that include partially overlapping image information may be stitched, and are used to generate the descriptor.

In a possible implementation of the first aspect, the preset descriptor database is generated based on a satellite image.

According to the visual localization method provided in this embodiment of this application, the preset descriptor database may be generated based on the satellite image. For example, an LOD (level of detail) model is generated based on the satellite image, candidate points are selected from the LOD model, and descriptors of the candidate points are obtained, to construct the descriptor database. In this solution, satellite images are used to build descriptor databases on a large scale automatically, with no need to capture images on site. This reduces workload and a database construction difficulty.

A second aspect of the embodiments of this application provides a visual localization method. The method includes: A server receives an image of a building sent by a terminal. The server generates a descriptor based on the image. The descriptor includes information about a horizontal viewing angle between a first vertical feature line and a second vertical feature line in the image, the first vertical feature line indicates a first facade intersection line of the building, and the second vertical feature line indicates a second facade intersection line of the building. The server performs matching in a preset descriptor database based on the descriptor, to obtain localization information of a photographing place of the image. The preset descriptor database includes geographical locations of candidate points and descriptors of the candidate points. The descriptor of the candidate point includes orientation information of a visible facade intersection line of a surrounding building by using the candidate point as a viewpoint, and a geographical location of a candidate point indicated by a descriptor that is in the preset descriptor database and that matches the descriptor of the image is the localization information of the photographing place of the image. The server sends the localization information to the terminal.

In a possible implementation of the second aspect, that the server generates a descriptor based on the image includes: The server extracts the first vertical feature line and the second vertical feature line of the building from the image. The server generates the descriptor based on a location relationship between the first vertical feature line and the second vertical feature line. The location relationship includes the information about the horizontal viewing angle between the first vertical feature line and the second vertical feature line.

According to the visual localization method provided in this embodiment of this application, the server may extract the first vertical feature line and the second vertical feature line of the building from the image, to generate the descriptor.

In a possible implementation of the second aspect, the descriptor includes height information and/or depth information of the first vertical feature line, and height information and/or depth information of the second vertical feature line. The height information of the first vertical feature line is used to indicate a height of the first facade intersection line, the height information of the second vertical feature line is used to indicate a height of the second facade intersection line, the depth information of the first vertical feature line is used to indicate a distance from the photographing place of the image to the first facade intersection line, and the depth information of the second vertical feature line is used to indicate a distance from the photographing place of the image to the second facade intersection line.

According to the visual localization method provided in this embodiment of this application, the descriptor may further include height information and/or depth information of a vertical feature line. In addition to the information about the horizontal viewing angle between the first vertical feature line and the second vertical feature line in the image, the descriptor may further provide more abundant location information about the facade intersection line of the building. The height information and the depth information may also be used for matching and localization. For example, when facade intersection lines of buildings around the photographing place are uniform, if the height information of the facade intersection lines is also included, localization precision may be improved, and orientation information during image photographing may be further provided.

In a possible implementation of the second aspect, the descriptor is expressed by using a ring array. The ring array includes first data indicating the first vertical feature line and second data indicating the second vertical feature line, and a location spacing between the first data and the second data in the ring array is used to indicate the information about the horizontal viewing angle between the first vertical feature line and the second vertical feature line.

According to the visual localization method provided in this embodiment of this application, a specific storage form of the descriptor is provided, that is, the ring array. Angle information without a specific orientation may be conveniently expressed by using a feature spacing, and matching with the descriptor database may be further facilitated.

In a possible implementation of the second aspect, the descriptor is expressed by using the ring array. The ring array includes the first data, the second data, and third data. The third data is used to indicate that no vertical feature line of the building appears.

According to the visual localization method provided in this embodiment of this application, another specific storage form of the descriptor is provided. The ring array includes data corresponding to each vertical feature line and the third data indicating that no vertical feature line of the building appears. This improves implementability of the solution.

In a possible implementation of the second aspect, the first data includes the height information and/or the depth information of the first vertical feature line, and the second data includes the height information and/or the depth information of the second vertical feature line.

According to the visual localization method provided in this embodiment of this application, another specific storage form of the descriptor is provided. The first data of the ring array may further include height information and/or depth information, and a specific manner of implementing storage of the height information and/or the depth information is provided.

In a possible implementation of the second aspect, the descriptor is expressed by using a circle, a first feature point that is on the circle and that indicates the first vertical feature line, and a second feature point that is on the circle and that indicates the second vertical feature line. The circle uses an optical center corresponding to the image as a circle center. The first feature point is a point obtained by projecting the first vertical feature line onto a cylinder that uses a gravity axis passing through the optical center as an axis, and then projecting the first vertical feature line onto a horizontal plane including the optical center. The second feature point is a point obtained by projecting the second vertical feature line onto the cylinder, and then projecting the second vertical feature line onto the horizontal plane. An included angle between a connection line between the first feature point and the circle center, and a connection line between the second feature point and the circle center is used to indicate the information about the horizontal viewing angle.

According to the visual localization method provided in this embodiment of this application, the descriptor may be expressed by using intuitive geometric information, so that a descriptor generation manner may be conveniently displayed, and a specific process of visual localization is reflected. This improves interaction experience.

In a possible implementation of the second aspect, the method further includes: The server obtains first localization information sent by the terminal. The first localization information includes localization information obtained based on a GPS signal, a Wi-Fi signal, location information of a base station serving the terminal, or localization information obtained by manually entering an address by a user. That the server performs matching in a preset descriptor database based on the descriptor, to obtain localization information of a photographing place of the image includes: The server performs matching in a first descriptor database based on the descriptor, to obtain the localization information. The first descriptor database includes a geographical location of a first candidate point and a descriptor of the first candidate point, and the first candidate point is a candidate point whose geographical location falls within a first location range corresponding to the first localization information.

According to the visual localization method provided in this embodiment of this application, the server may obtain the rough first location range based on the first localization information. In this case, a matching range of the descriptor database is narrowed. Matching is performed only based on descriptors of candidate points that fall within the first location range. This can reduce a calculation amount and increase a visual localization speed.

In a possible implementation of the second aspect, the method further includes: The server obtains photographing orientation information of the image sent by the terminal. That the server performs matching in a preset descriptor database based on the descriptor, to obtain localization information of a photographing place of the image includes: The terminal performs matching in the preset descriptor database based on the descriptor and a first angle range determined by using the photographing orientation information, to obtain the localization information.

According to the visual localization method provided in this embodiment of this application, the server may obtain the photographing orientation information of the image, and perform matching with a descriptor of a candidate point within an angle range restricted by the orientation information. This can reduce a calculation amount and can increase a visual localization speed.

In a possible implementation of the second aspect, that a server receives an image of a building sent by a terminal includes: The server receives a first image photographed in a first place and a second image photographed in a second place. The first place and the second place are a same place, or a distance between the first place and the second place is less than a preset threshold, and the first image and the second image include partially overlapping image information.

According to the visual localization method provided in this embodiment of this application, the server may widen a field of view by photographing a plurality of images, to obtain image information of more buildings. The first image and the second image that include partially overlapping image information may be stitched, and are used to generate the descriptor.

In a possible implementation of the second aspect, the preset descriptor database is generated based on the satellite image.

According to the visual localization method provided in this embodiment of this application, the preset descriptor database may be generated based on the satellite image. For example, an LOD model is generated based on the satellite image, candidate points are selected from the LOD model, and descriptors of the candidate points are obtained, to construct the descriptor database. In this solution, satellite images are used to build descriptor databases on a large scale automatically, with no need to capture images on site. This reduces workload and a database construction difficulty.

A third aspect of the embodiments of this application provides a visual localization method. The method includes: A terminal obtains an image of a building. The terminal sends the image to a server. The terminal obtains localization information sent by the server. The localization information is obtained by matching by the server in a preset descriptor database based on a descriptor generated by using the image, and the descriptor includes information about a horizontal viewing angle between a first vertical feature line and a second vertical feature line in the image, the first vertical feature line indicates a first facade intersection line of the building, and the second vertical feature line indicates a second facade intersection line of the building. The preset descriptor database includes geographical locations of candidate points and descriptors of the candidate points. The descriptor of the candidate point includes orientation information of a visible facade intersection line of a surrounding building by using the candidate point as a viewpoint, and a geographical location of a candidate point indicated by a descriptor that is in the preset descriptor database and that matches the descriptor of the image is the localization information of the photographing place of the image.

In a possible implementation of the third aspect, the terminal obtains photographing orientation information of the image. The terminal sends the photographing orientation information to the server. The photographing orientation information is used to determine a first angle range. The localization information is obtained by performing matching, in the descriptor database preset by the server, based on the descriptor generated by the server within the first angle range by using the image.

A fourth aspect of the embodiments of this application provides a visual localization method. The method includes: A server obtains first localization information sent by a terminal. The server sends a preset descriptor database to the terminal based on the first localization information. The preset descriptor database includes a geographical location of a first candidate point and a descriptor of the first candidate point, and the first candidate point is the candidate point whose geographical location falls within a first location range corresponding to the first localization information. The first descriptor database is used for visual localization of the terminal.

A fifth aspect of the embodiments of this application provides a terminal. The terminal includes: an obtaining unit, configured to obtain an image of a building; and a generation unit, configured to generate a descriptor based on the image. The descriptor includes information about a horizontal viewing angle between a first vertical feature line and a second vertical feature line in the image, the first vertical feature line indicates a first facade intersection line of the building, and the second vertical feature line indicates a second facade intersection line of the building. The obtaining unit is further configured to perform matching in a preset descriptor database based on the descriptor, to obtain localization information of a photographing place of the image. The preset descriptor database includes geographical locations of candidate points and descriptors of the candidate points. The descriptor of the candidate point includes orientation information of a visible facade intersection line of a surrounding building by using the candidate point as a viewpoint, and a geographical location of a candidate point indicated by a descriptor that is in the preset descriptor database and that matches the descriptor of the image is the localization information of the photographing place of the image.

In a possible implementation of the fifth aspect, the generation unit is specifically configured to: extract the first vertical feature line and the second vertical feature line of the building from the image; and generate the descriptor based on a location relationship between the first vertical feature line and the second vertical feature line. The location relationship includes the information about the horizontal viewing angle between the first vertical feature line and the second vertical feature line.

In a possible implementation of the fifth aspect, the descriptor includes height information and/or depth information of the first vertical feature line, and height information and/or depth information of the second vertical feature line. The height information of the first vertical feature line is used to indicate a height of the first facade intersection line, the height information of the second vertical feature line is used to indicate a height of the second facade intersection line, the depth information of the first vertical feature line is used to indicate a distance from the photographing place of the image to the first facade intersection line, and the depth information of the second vertical feature line is used to indicate a distance from the photographing place of the image to the second facade intersection line.

In a possible implementation of the fifth aspect, the descriptor is expressed by using a ring array. The ring array includes first data indicating the first vertical feature line and second data indicating the second vertical feature line, and a location spacing between the first data and the second data in the ring array is used to indicate the information about the horizontal viewing angle between the first vertical feature line and the second vertical feature line.

In a possible implementation of the fifth aspect, the descriptor is expressed by using the ring array. The ring array includes the first data, the second data, and third data. The third data is used to indicate that no vertical feature line of the building appears.

In a possible implementation of the fifth aspect, the first data includes the height information and/or the depth information of the first vertical feature line, and the second data includes the height information and/or the depth information of the second vertical feature line.

In a possible implementation of the fifth aspect, the descriptor is expressed by using a circle, a first feature point that is on the circle and that indicates the first vertical feature line, and a second feature point that is on the circle and that indicates the second vertical feature line. The circle uses an optical center corresponding to the image as a circle center. The first feature point is a point obtained by projecting the first vertical feature line onto a cylinder that uses a gravity axis passing through the optical center as an axis, and then projecting the first vertical feature line onto a horizontal plane including the optical center. The second feature point is a point obtained by projecting the second vertical feature line onto the cylinder, and then projecting the second vertical feature line onto the horizontal plane. An included angle between a connection line between the first feature point and the circle center, and a connection line between the second feature point and the circle center is used to indicate the information about the horizontal viewing angle.

In a possible implementation of the fifth aspect, the obtaining unit is further configured to obtain first localization information. The first localization information includes localization information obtained based on a GPS signal, a Wi-Fi signal, location information of a base station serving the terminal, or localization information obtained by manually entering an address by a user. The obtaining unit is specifically configured to perform matching in a first descriptor database based on the descriptor, to obtain the localization information. The first descriptor database includes a geographical location of a first candidate point and a descriptor of the first candidate point, and the first candidate point is a candidate point whose geographical location falls within a first location range corresponding to the first localization information.

In a possible implementation of the fifth aspect, the obtaining unit is further configured to obtain the first localization information. The first localization information includes the localization information obtained based on the GPS signal, the Wi-Fi signal, the location information of the base station serving the terminal, or the localization information obtained by manually entering the address by the user. The terminal further includes: a sending unit, configured to send the first localization information to a server; and a receiving unit, configured to receive the preset descriptor database sent by the server, where the preset descriptor database includes the geographical location of the first candidate point and the descriptor of the first candidate point, and the first candidate point is the candidate point whose geographical location falls within the first location range corresponding to the first localization information.

In a possible implementation of the fifth aspect, the obtaining unit is further configured to obtain photographing orientation information of the image. The obtaining unit is specifically configured to perform matching in the preset descriptor database based on the descriptor and a first angle range determined by using the photographing orientation information, to obtain the localization information.

In a possible implementation of the fifth aspect, the obtaining unit is specifically configured to obtain a first image photographed in a first place and a second image photographed in a second place. The first place and the second place are a same place, or a distance between the first place and the second place is less than a preset threshold, and the first image and the second image include partially overlapping image information.

In a possible implementation of the fifth aspect, the preset descriptor database is generated based on the satellite image.

A sixth aspect of the embodiments of this application provides a server. The server includes: a receiving unit, configured to receive an image of a building sent by a terminal; a generation unit, configured to generate a descriptor based on the image, where the descriptor includes information about a horizontal viewing angle between a first vertical feature line and a second vertical feature line in the image, the first vertical feature line indicates a first facade intersection line of the building, and the second vertical feature line indicates a second facade intersection line of the building; an obtaining unit, configured to perform matching in a preset descriptor database based on the descriptor, to obtain localization information of a photographing place of the image, where the preset descriptor database includes geographical locations of candidate points and descriptors of the candidate points, the descriptor of the candidate point includes orientation information of a visible facade intersection line of a surrounding building by using the candidate point as a viewpoint, and a geographical location of a candidate point indicated by a descriptor that is in the preset descriptor database and that matches the descriptor of the image is the localization information of the photographing place of the image; and a sending unit, configured to send the localization information to the terminal.

In a possible implementation of the sixth aspect, the generation unit is specifically configured to: extract the first vertical feature line and the second vertical feature line of the building from the image; and generate the descriptor based on a location relationship between the first vertical feature line and the second vertical feature line, where the location relationship includes the information about the horizontal viewing angle between the first vertical feature line and the second vertical feature line.

In a possible implementation of the sixth aspect, the descriptor includes height information and/or depth information of the first vertical feature line, and height information and/or depth information of the second vertical feature line. The height information of the first vertical feature line is used to indicate a height of the first facade intersection line, the height information of the second vertical feature line is used to indicate a height of the second facade intersection line, the depth information of the first vertical feature line is used to indicate a distance from the photo- graphing place of the image to the first facade intersection line, and the depth information of the second vertical feature line is used to indicate a distance from the photographing place of the image to the second facade intersection line.

In a possible implementation of the sixth aspect, the descriptor is expressed by using a ring array. The ring array includes first data indicating the first vertical feature line and second data indicating the second vertical feature line, and a location spacing between the first data and the second data in the ring array is used to indicate the information about the horizontal viewing angle between the first vertical feature line and the second vertical feature line.

In a possible implementation of the sixth aspect, the descriptor is expressed by using the ring array. The ring array includes the first data, the second data, and third data. The third data is used to indicate that no vertical feature line of the building appears.

In a possible implementation of the sixth aspect, the first data includes the height information and/or the depth information of the first vertical feature line, and the second data includes the height information and/or the depth information of the second vertical feature line.

In a possible implementation of the sixth aspect, the descriptor is expressed by using a circle, a first feature point that is on the circle and that indicates the first vertical feature line, and a second feature point that is on the circle and that indicates the second vertical feature line. The circle uses an optical center corresponding to the image as a circle center. The first feature point is a point obtained by projecting the first vertical feature line onto a cylinder that uses a gravity axis passing through the optical center as an axis, and then projecting the first vertical feature line onto a horizontal plane including the optical center. The second feature point is a point obtained by projecting the second vertical feature line onto the cylinder, and then projecting the second vertical feature line onto the horizontal plane. An included angle between a connection line between the first feature point and the circle center, and a connection line between the second feature point and the circle center is used to indicate the information about the horizontal viewing angle.

In a possible implementation of the sixth aspect, the preset descriptor database includes geographical locations of candidate points and descriptors of the candidate points. The descriptor of the candidate point includes orientation information of a visible facade intersection line of a surrounding building by using the candidate point as a viewpoint.

In a possible implementation of the sixth aspect, the obtaining unit is further configured to obtain first localization information sent by the terminal. The first localization information includes localization information obtained based on a GPS signal, a Wi-Fi signal, location information of a base station serving the terminal, or localization information obtained by manually entering an address by a user. The obtaining unit is specifically configured to perform matching in a first descriptor database based on the descriptor, to obtain the localization information. The first descriptor database includes a geographical location of a first candidate point and a descriptor of the first candidate point, and the first candidate point is a candidate point whose geographical location falls within a first location range corresponding to the first localization information.

In a possible implementation of the sixth aspect, the obtaining unit is further configured to obtain photographing orientation information of the image sent by the terminal. The obtaining unit is specifically configured to perform matching in the preset descriptor database based on the descriptor and a first angle range determined by using the photographing orientation information, to obtain the localization information.

In a possible implementation of the sixth aspect, the receiving unit is specifically configured to receive a first image photographed in a first place and a second image photographed in a second place. The first place and the second place are a same place, or a distance between the first place and the second place is less than a preset threshold, and the first image and the second image include partially overlapping image information.

In a possible implementation of the sixth aspect, the preset descriptor database is generated based on the satellite image.

A seventh aspect of the embodiments of this application provides a terminal. The terminal includes a processor and a memory. The memory is configured to store instructions. The processor is configured to perform, according to the instructions, the method according to the implementations provided in the first aspect or the third aspect.

An eighth aspect of the embodiments of this application provides a server. The server includes a processor and a memory. The memory is configured to store instructions. The processor is configured to perform, according to the instructions, the method according to the implementations provided in the second aspect or the fourth aspect.

A ninth aspect of the embodiments of this application provides a computer program product including instructions. When the computer program product is run on a computer, the computer is enabled to perform the method according to the implementations provided in the first aspect to the fourth aspect.

A tenth aspect of the embodiments of this application provides a computer-readable storage medium. The computer-readable storage medium stores instructions. When the instructions are run on a computer, the computer is enabled to perform the method according to the implementations provided in the first aspect to the fourth aspect.

According to the foregoing technical solutions, it can be learned that the embodiments of this application have the following advantages:

According to the visual localization method provided in the embodiments of this application, the image of the building is obtained by photographing the building, the descriptor is generated based on the image, and the localization information of the photographing place of the image is obtained by performing matching in the preset descriptor database based on the descriptor. The descriptor includes the information about the horizontal viewing angle between the first vertical feature line and the second vertical feature line in the image, the first vertical feature line indicates the first facade intersection line of the building, and the second vertical feature line indicates the second facade intersection line of the building. According to the visual localization method provided in the embodiments of this application, the vertical feature line extracted from the image has geometric semantic information, and corresponds to a facade intersection line of a physical building. The vertical feature line is not prone to be affected by a scenario change that occurs during image photographing. Even if the building is partially blocked, a top skyline is not photographed, an illumination condition changes greatly, or it is rainy or snowy, generation and use of the descriptor is not affected. According to the descriptor matching, precision of the visual localization result obtained is high.

In addition, in a conventional technology, a feature point is extracted based on a luminance change of image pixels. A descriptor of the feature point is used to describe a value relationship between the feature point and a peripheral pixel, and is usually a multi-dimensional feature vector, for example, a 128-dimensional feature vector. It can be learned that there is a large quantity of feature points, and a calculation amount for descriptor generation is large. However, in this application, the vertical feature lines that are in the image and that correspond to the facade intersection lines of the physical building are extracted, the descriptor includes information about a horizontal viewing angle between the vertical feature lines, and there is a small quantity of vertical feature lines. Therefore, calculation for obtaining the descriptor is simpler.

In addition, in the conventional technology, a large number of images need to be captured on site for constructing a descriptor database, and the database needs to be updated during a seasonal change, which is time-consuming and labor-consuming. In this embodiment of this application, descriptor databases may be constructed automatically on a large scale by using satellite images, with no need to capture images on site. This greatly reduces workload and reduces a database construction difficulty.

In addition, in the conventional technology, the descriptor database stores a large quantity of two-dimensional images, three-dimensional feature point clouds, and descriptors of feature points. In this case, a data volume is large; therefore, a large amount of storage space is required. As a result, the descriptor database is usually constructed only based on a small geographical range. However, according to the visual localization method provided in the embodiments of this application, the descriptor generated based on the image is directly associated with descriptors of candidate points on a map, and the descriptor records orientation information of a visible facade intersection line of a building surrounding a candidate point, with no need to store a large quantity of two-dimensional images or a large amount of three-dimensional point cloud data. In this case, a data amount is small, and space occupied for storage is small. For example, for a same location range, the descriptor database in this solution is about one millionth of a visual simultaneous localization and mapping (vSLAM) feature database.

DESCRIPTION OF EMBODIMENTS

The embodiments of this application provide a visual localization method, to improve visual localization precision in a scenario in which a lighting condition changes greatly.

The following describes the embodiments of this application with reference to accompanying drawings. It is clear that the described embodiments are merely some but not all of the embodiments of this application. A person of ordinary skill in the art may learn that technical solutions provided in the embodiments of this application are also applicable to similar technical problems with development of technologies and emergence of new scenarios.

In the specification, claims, and accompanying drawings of this application, terms "first", "second", and so on are intended to distinguish between similar objects, but do not necessarily indicate a specific order or sequence. It should be understood that data termed in such a way are interchangeable in an appropriate circumstance, so that the embodiments described herein can be implemented in an order other than orders illustrated or described herein. In addition, terms "include" and "have" and any variations thereof are intended to cover non-exclusive inclusions, for example, a process, method, system, product, or device including a series of steps or modules is not necessarily limited to those clearly listed steps or modules, but may include other steps or modules that are not clearly listed or are inherent to these processes, methods, products, or devices. Naming or numbering of steps in this application does not mean that steps in a method procedure need to be performed according to a time/logical order indicated by the naming or numbering. An execution order of process steps that have been named or numbered may be changed according to a technical objective to be implemented, provided that a same technical effect or similar technical effects can be achieved.

Figure 1:
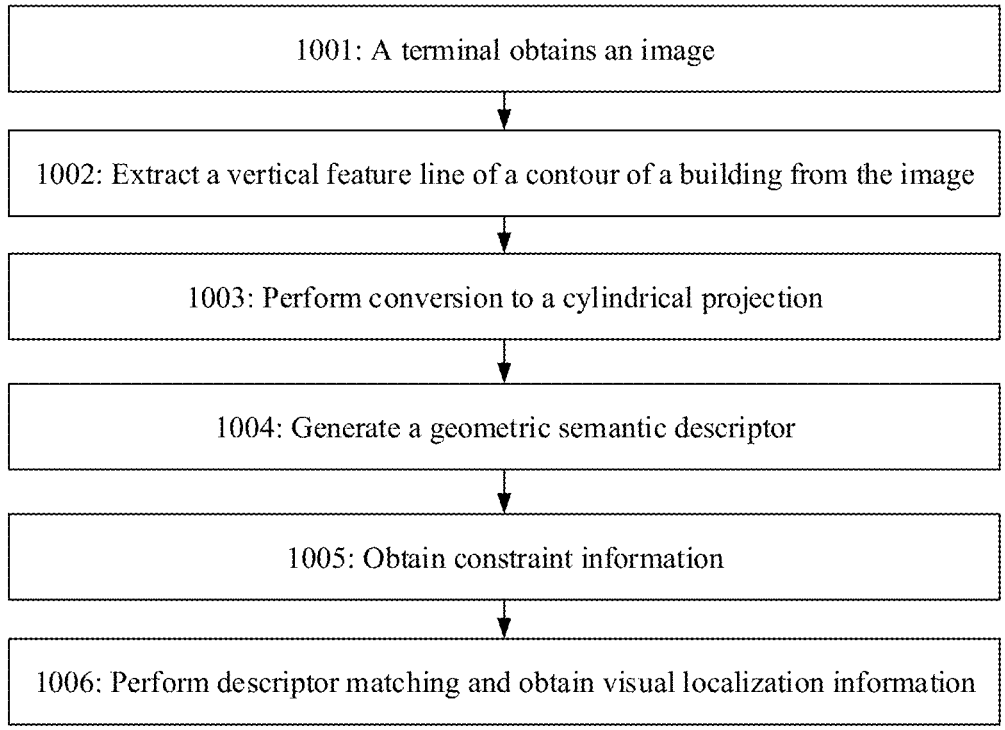
FIG. 1 is a schematic diagram of an embodiment of a visual localization method according to embodiments of this application.

FIG. 1 is a schematic diagram of an embodiment of a visual localization method according to the embodiments of this application.

The visual localization method provided in this embodiment of this application includes the following steps.

1001: A Terminal Obtains an Image of a Building.

When a user needs to obtain information about a current accurate location of the user, the user may perform visual localization by photographing a surrounding building. The terminal obtains the image obtained by photographing the building, where the image includes a building image.

Optionally, there are a plurality of image capture devices that obtain the image. The image capture device may be a monocular camera, a binocular camera, a depth camera, a laser radar, or the like. A specific type of the image capture device is not limited herein. The image capture device may be a camera component disposed inside the terminal, or may be a device that is disposed outside the terminal and that is capable of communicating with the terminal. A form of disposing the image capture device is not specifically limited herein.

In some scenarios, because a field of view of a single image is small, a complete building cannot be photographed, and information that is provided is limited. The terminal may enlarge the field of view by obtaining a plurality of images, to increase an image information amount. The terminal may obtain one image, or may obtain a plurality of images. A quantity of obtained images is not limited herein. Optionally, the terminal obtains a first image photographed in a first place and a second image photographed in a second place. The first place and the second place are a same place, or a distance between the first place and the second place is less than a preset threshold, and the first image and the second image include partially overlapping image information.

The plurality of images may be photographed in a same place. For example, the user photographs the building by using the terminal, rotates the terminal, obtains a plurality of photos with overlapping fields of view through capturing at equal spacings, intelligent recognition, or the like, and stitches the plurality of images by using an image stitching algorithm, to obtain an image including the building. It should be noted that, in a process of photographing the plurality of images, the image capture device is usually relatively displaced. Herein, the distance between the first place in which the first image is photographed and the second place in which the second image is photographed should be less than the preset threshold, and the preset threshold may be set according to an actual use requirement. Optionally, the preset threshold may be a negligible displacement value in terms of a depth of field for long-range photographing. For example, a ratio of the depth of field to the displacement value is greater than 100, and may be 200, 500, or the like. For example, the image depth of field is 200 meters, and the preset threshold may be 1 meter. When the user holds the terminal in situ for photographing, displacement generated by arm rotation is usually within 0.5 meter, and images obtained in such a manner may be considered as being located in a same photographing place.

1002: Extract a Vertical Feature Line of the Building from the Image.

Figure 2:
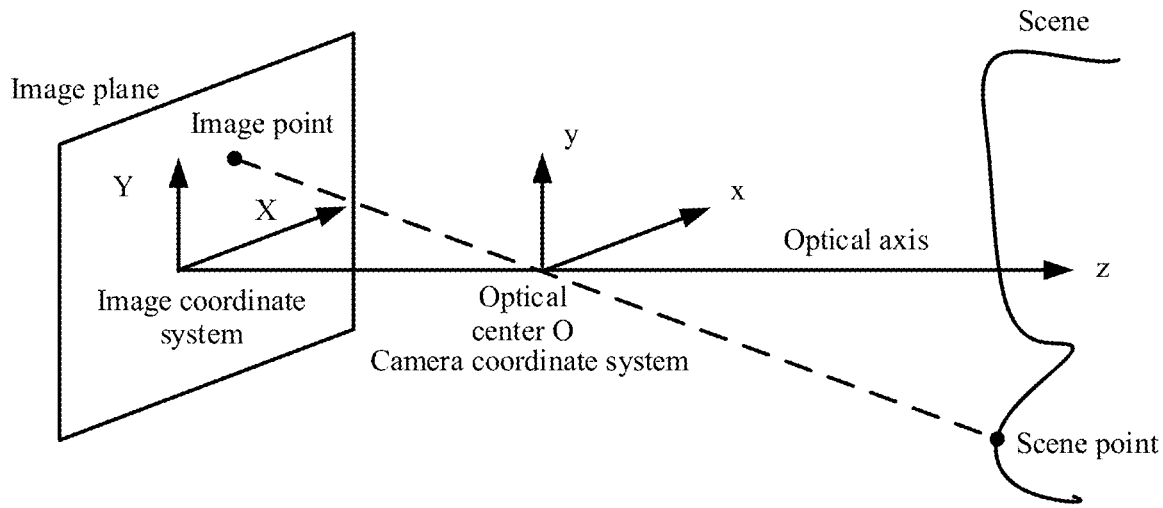
FIG. 2 is a schematic diagram of a camera coordinate system.

For ease of description, the following describes a camera coordinate system and an image coordinate system. Refer to FIG. 2. The camera coordinate system is a three-dimensional rectangular coordinate system in which an optical center O of a camera is an origin and an optical axis is a z-axis. An x-axis and a y-axis of the camera coordinate system are parallel to an X-axis and a Y-axis of the image, and a z-axis of the camera coordinate system is an optical axis of the camera and is perpendicular to an image plane. An intersection point of the optical axis and the image plane is an origin of the image coordinate system, and the image coordinate system is a two-dimensional rectangular coordinate system.

A facade is usually an exterior wall of a building, including a front wall, a side wall, or a back wall. In three-dimensional space, an intersection line is an intersection line of a three-dimensional surface. An intersection line of a facade is shortened to a facade intersection line in this embodiment of this application, and is a line of intersection between adjacent external walls of a building.

Because the facade intersection line of the building is usually perpendicular to a horizontal plane, correspondingly, if the x-axis of the camera is horizontal when the building is photographed, a vertical feature line of the building in the obtained image should be a line segment parallel to the Y-axis. However, in an actual application, the x-axis of the camera coordinate system may be not horizontal during image photographing. In this case, there is a specific included angle between the vertical feature line of the building in the obtained image and the Y-axis of the image, and regularization processing needs to be performed on a contour line of the building. For example, a vertical feature line perpendicular to the Y-axis of the image can be obtained by performing rotation and conversion by using an image correction technology.

Optionally, a process of performing regularization processing on the contour line of the building includes: rotating the camera coordinate system around the x-axis and the z-axis of the camera coordinate system, so that the x-axis of the camera coordinate system is parallel to a horizontal axis of a world coordinate system, and the y-axis of the camera coordinate system is parallel to a gravity axis of the world coordinate system. The Y-axis of the image coordinate system for camera imaging is enabled to be parallel to a y-axis of the gravity axis in the world coordinate system, to complete image correction, so that a vertical contour line of the building in the image is parallel to they axis of the image coordinate system.

There are a plurality of manners of extracting the vertical feature line of the building from the image. This is not specifically limited in this application.

Figure 3:
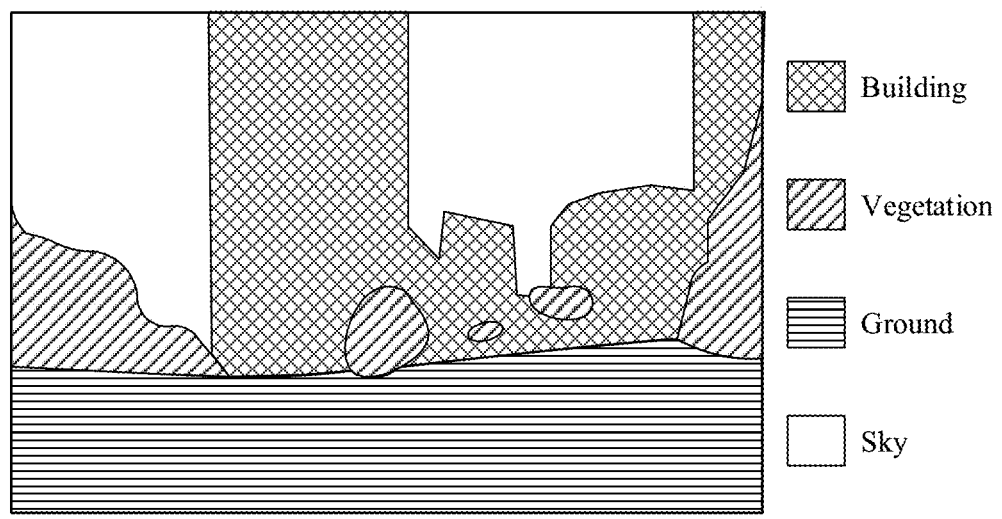
FIG. 3 is a schematic diagram of performing semantic segmentation on an image according to an embodiment of this application.
Figure 4:
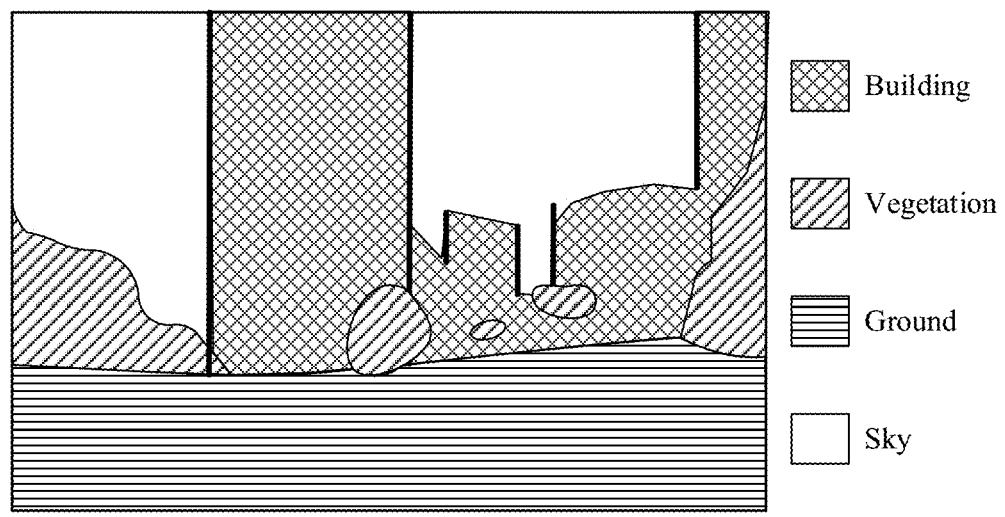
FIG. 4 is a schematic diagram of obtaining vertical feature lines of a building according to an embodiment of this application.

Optionally, first, a semantic segmentation algorithm is used to recognize and distinguish between image information of different types of objects in the image. For example, FIG. 3 is a schematic diagram of performing semantic segmentation on the image according to this embodiment of this application. The image is segmented into a building zone, a vegetation zone, a ground zone, and a sky region. In this case, a contour line of the building can be obtained, and then vertical lines in the contour line are extracted as vertical feature lines of the image. FIG. 4 is a schematic diagram of obtaining vertical feature lines of the building according to this embodiment of this application. A bold line segment in the figure indicates an obtained vertical feature line. Optionally, information about a regularized line segment in the image may be obtained by using a line extraction algorithm such as a line segment detector (LSD), and then a classification result mask obtained through semantic segmentation is used as a constraint to eliminate outliers inside and outside a range of the building, and retain only target segments at junctions of the building zone and the sky zone. Finally, each direct line segment to be extracted is prolongated within an effective range of a building mask in a slope direction of the line segment, to obtain a direct line segment conforming to a shape of an exterior contour of the building.

1003: Perform Conversion to a Cylindrical Projection.

An image photographed by a camera is usually a centrally projected image, and the centrally projected image is cylindrically projected onto a cylinder whose axis is the y-axis of the camera coordinate system, so that conversion from a central projection to a cylindrical projection may be implemented.

A cylindrically projected image is projected onto a plane xOz on which the x-axis and z-axis of the camera coordinate system are located, to obtain a circle with an optical center O as a circle center. A vertical feature line of the building obtained from the image is projected into a feature point on the circle. The feature point represents a vertical feature line of the building obtained from the image.

Figure 5:
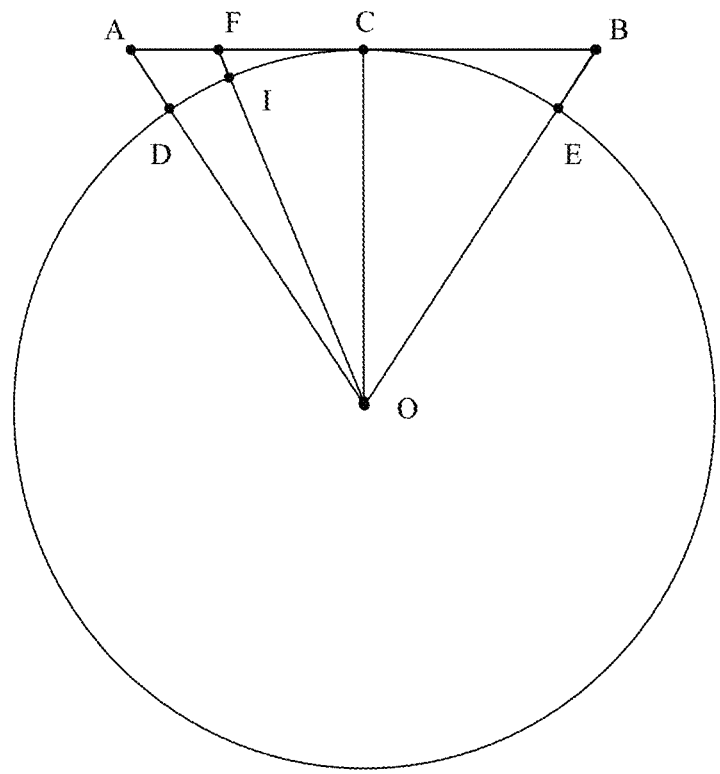
FIG. 5 is a schematic diagram of conversion to a cylindrical projection according to an embodiment of this application.

FIG. 5 is a schematic diagram of conversion to the cylindrical projection. A straight line segment formed by connecting a point A and a point B represents an imaging surface of a central projection, and an arc segment formed by a point D, a point I, and a point E is an imaging surface of the cylindrical projection. A point C is a midpoint of the line segment AB. Because a focal length of a camera that obtains the centrally projected image is known, a distance between the imaging surface AB of the central projection and the optical center O, that is, a length of the line segment OC, may be obtained based on the focal length. A cylinder radius is a specified value, and a specific value of the cylinder radius is not limited. Optionally, in FIG. 5, a length of the OC is used as the cylinder radius.

As shown in FIG. 5, the point D is an intersection point between a line segment AO and an arc of the circle O. That is, after conversion to the cylindrical projection, the point A in the image corresponds to the point D on a cylindrical projection surface. Similarly, a point F corresponds to the point I, the point C is an intersection point between the cylindrical projection and the central projection, and the point B corresponds to a point E. If the point F represents a vertical feature line of a building, an intersection point between a circle in which the point O is located and a line connecting the point F and the point O is the point I, that is, a feature point of a geometric semantic descriptor. The vertical feature line of the building in the cylindrical projection is a feature point of a geometric semantic descriptor in this embodiment of this application.

It should be noted that an execution order of step 1003 and step 1002 is not limited. Step 1002 may be performed before step 1003, or step 1003 may be performed before step 1002. Details are provided in the following:

1. The vertical feature line of the building is first extracted from the image, and then conversion to the cylindrical projection is performed.

Figure 6:
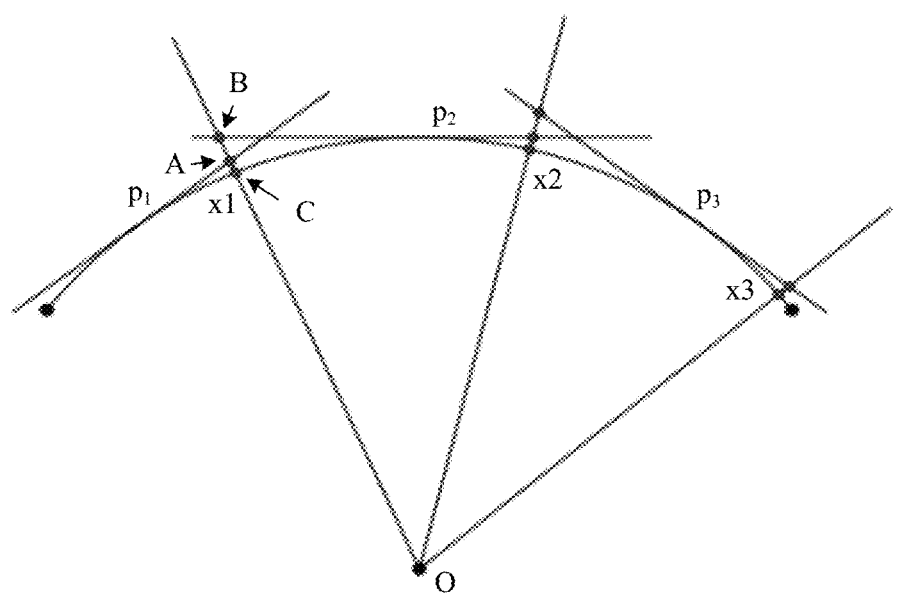
FIG. 6 is a schematic diagram of performing a cylindrical projection on a plurality of images according to an embodiment of this application.

In this case, conversion to the cylindrical projection may be performed only on the obtained vertical feature line. If a vertical feature line of the building in each image is obtained based on a plurality of images with overlapping information, vertical feature lines that overlap in the plurality of images overlap in the cylindrical projection after the cylindrical projection. FIG. 6 is a schematic diagram of performing the cylindrical projection on a plurality of images. P1, P2, and P3 represent three images photographed in a same location, where the point A is a vertical feature line of a building extracted from the P1. Because the P1 and the P2 include some image information that overlaps, the vertical feature line represented by the point A and a vertical feature line represented by the point B in the P2 correspond to a facade intersection line of the same physical building. When a central projection is converted into a cylindrical projection, both the point A and the point B are projected onto a point C on the cylindrical projection.

2. Conversion to the cylindrical projection is performed, and then the vertical feature line of the building is extracted from a cylindrically projected image.

An entire centrally projected image that is obtained needs to be converted into a cylindrically projected image, and then the vertical feature line of the building is extracted from the cylindrically projected image.

It should be noted that, when stitching needs to be performed based on a plurality of images with overlapping information, the cylindrical projection is usually performed before stitching. Because the photographed images are all centrally projected images and the imaging surface of the image is a plane, if a plurality of images are directly stitched, a stitching result may be greatly deformed due to projection deformation. Therefore, the central projection needs to be converted to a cylindrical projection surface by performing conversion to the cylindrical projection first, so that projection surfaces of all to-be-processed images are consistent. Because the plurality of images are photographed by a same capture device in a same location, for outdoor long-range photographing, a location in which a terminal takes an image may be approximately used as a location of an optical center of a camera. Because the plurality of images are photographed in the same location, this case may be considered as single-viewpoint rotation. Therefore, the plurality of images may be converted to a same coordinate system.

Optionally, when image stitching is performed on the plurality of images having overlapping information, because luminance for photographing the plurality of images may be inconsistent, an obvious stitching gap usually occurs after stitching. Therefore, image fusion needs to be performed to eliminate the stitching gap. For example, three images are obtained for stitching. The $1^{st}$ image may be used as a reference image, and the $2^{nd}$ image and the $3^{rd}$ image are sequentially stitched into a coordinate system of the $1^{st}$ image. There are a plurality of image fusion manners, and this is not specifically limited herein. Optionally, a weighted average method is used. To be specific, when a pixel of a to-be-stitched image is closer to a stitching edge, a weight of a pixel value of the to-be-stitched image is larger, and a weight of a pixel value of a stitched image is smaller. In this case, a weighted average is used to obtain the stitched image.

1004: Generate a Geometric Semantic Descriptor.

The descriptor includes information about a horizontal viewing angle between a first vertical feature line and a second vertical feature line in the image, the first vertical feature line indicates a first facade intersection line of the building, and the second vertical feature line indicates a second facade intersection line of the building. For an image, a unique viewpoint of the image, that is, an optical center of a camera that photographs the image, may be determined. When viewed from the viewpoint, the information about the horizontal viewing angle between the first vertical feature line and the second vertical feature line may be determined on a horizontal plane. The information about the horizontal viewing angle includes that, as viewed from the point, a first intersection point exists between the first vertical feature line and a horizontal plane passing through the point, and that a second intersection point exists between the second vertical feature line and the horizontal plane. An included angle formed by connecting each of the first intersection point and the second intersection point to the observation point is a horizontal viewing angle between the first vertical feature line and the second vertical feature line. It can be learned that the information about the horizontal viewing angle carries relative location information between the first vertical feature line and the second vertical feature line.

It should be noted that there may be one or more buildings photographed in the image, and the first vertical feature line and the second vertical feature line may indicate facade intersection lines of a same building, or may indicate facade intersection lines of different buildings. This is not limited in this embodiment of this application.

In step 1003, a first feature point is a feature point obtained by projecting the first vertical feature line onto a cylinder that uses a gravity axis passing through the optical center as an axis, and then projecting the first vertical feature line onto a horizontal plane including the optical center, and the descriptor may be generated based on an angular relationship between connection lines between the optical center and feature points. In this embodiment of this application, the descriptor is also referred to as a geometric semantic descriptor.

Optionally, a first feature point and a second feature point on a circle that is on an xOz plane of a camera coordinate system and that uses an optical center O as a circle center are obtained by performing conversion to a cylindrical projection on the first vertical feature line and the second vertical feature line of the building that are extracted from the image. The descriptor includes angle information corresponding to an arc including the first feature point and the second feature point.

Optionally, the geometric semantic descriptor includes only angle information between feature points. Optionally, height information of a vertical contour line of the building on the image may alternatively be recorded in information corresponding to feature points, and the geometric semantic descriptor includes angle information between feature points and height information of the feature points. The height information may be pixel height information.

Optionally, if a sensor has depth data or obtains a depth value of a vertical contour line through binocular depth estimation or monocular depth recovery, or by using another technology, the depth data or the depth value of the vertical contour line may alternatively be recorded in information corresponding to feature points. The geometric semantic descriptor includes angle information between feature points and depth information of the feature points. The height information is used to indicate a height of the second facade intersection line, and the depth information is used to indicate a distance from a photographing place of the image to a facade intersection line of the corresponding building.

Optionally, the descriptor includes a ring array, that is, information about the descriptor is expressed or stored by the ring array. The ring array includes first data indicating the first vertical feature line and second data indicating the second vertical feature line, and a location spacing between the first data and the second data in the ring array is used to indicate the information about the horizontal viewing angle between the first vertical feature line and the second vertical feature line.

Optionally, the descriptor is expressed by using the ring array. The ring array includes the first data, the second data, and third data. The third data is used to indicate that no vertical feature line of the building appears.

Optionally, precision of the information about the horizontal view angle may be determined based on an actual requirement, for example, 1 degree or 0.1 degree. This is not specifically limited herein.

For example, precision of the angle information is 1 degree. The ring array includes 360 pieces of data used to represent feature point information within a 360-degree range. A digit "1" may indicate that one feature point exists within an angle, and a digit "0" indicates that no feature point is detected or exists. It may be understood that a field of view for obtaining an image generally includes only a part of a 360-degree field of view, and a remaining field of view in which no image is obtained may be filled with "0". Therefore, a geometric semantic descriptor corresponding to the image may be generated. A location of "1" is used herein to describe a spatial relationship of the vertical contour line of the building based on the photographing place of the image. If height information and/or depth information of a feature point needs to be recorded, "1" may be replaced by a line length of a vertical contour line in the image, that is, a pixel height; or "1" may be replaced by a depth of a vertical contour line of the building that is obtained through monocular estimation and a depth of a vertical contour line of the building on a map. This increases an information dimension and improves robustness.

Optionally, the descriptor is expressed by using a circle, a first feature point that is on the circle and that indicates the first vertical feature line, and a second feature point that is on the circle and that indicates the second vertical feature line. The circle uses an optical center corresponding to the image as a circle center. The first feature point is a point obtained by projecting the first vertical feature line onto a cylinder that uses a gravity axis passing through the optical center as an axis, and then projecting the first vertical feature line onto a horizontal plane including the optical center. The second feature point is a point obtained by projecting the second vertical feature line onto the cylinder, and then projecting the second vertical feature line onto the horizontal plane. An included angle between a connection line between the first feature point and the circle center, and a connection line between the second feature point and the circle center is used to indicate the information about the horizontal viewing angle.

1005: Obtain Constraint Information.

The constraint information obtained by the terminal includes first localization information and/or azimuth information used when the image is photographed.

The first localization information includes localization information obtained based on a GPS signal, a Wi-Fi signal, location information of a base station serving the terminal, or localization information obtained by manually entering an address by a user. The localization information has low precision, and may provide reference for visual localization. Within a first location range determined based on the first localization information, visual localization that is more accurate than the first localization information is further obtained in a geometric semantic descriptor matching manner.

The terminal performs matching in a first descriptor database based on the descriptor, to obtain the localization information. The first descriptor database includes a geographical location of a first candidate point and a descriptor of the first candidate point, and the first candidate point is a candidate point whose geographical location falls within a first location range corresponding to the first localization information. Within the first location range determined based on the first localization information, matching is performed in a preset descriptor database based on the descriptor, so that the terminal obtains more accurate localization information within the first location range.

The azimuth information is angle information obtained by the terminal sensor when the image is photographed. Optionally, the azimuth information is an orientation angle obtained by a magnetometer, represents an orientation that is present when the image is photographed, and is specifically a direction in an east-north-up (ENU) coordinate system. It may be understood that coordinates in the ENU coordinate system that are provided by the magnetometer have a specific error and low precision, and may be used to provide reference for visual localization. The terminal obtains photographing orientation information of the image. The terminal performs matching in the preset descriptor database based on the descriptor and a first angle range determined by using the photographing orientation information, to obtain the localization information.

It should be noted that step 1005 is an optional step, and may or may not be performed. This is not limited herein. If step 1005 is performed, constraint information used when the image is obtained in step 1001 is usually obtained.

1006: Perform Descriptor Matching and Obtain Visual Localization Information.

The preset descriptor database includes geographical locations of candidate points and descriptors of the candidate points. The descriptor of the candidate point includes orientation information of a visible facade intersection line of a surrounding building by using the candidate point as a viewpoint.

Matching is performed between the geometric semantic descriptor of the image and a descriptor of a candidate point in the preset descriptor database, a candidate point related to the localization information is obtained based on a similarity obtained through matching, and visual localization of a photographing place of the image may be determined based on a coordinate location of the candidate point on the map. That is, a geographical location of a candidate point indicated by a descriptor matching the descriptor of the image in the preset descriptor database is localization information of the photographing place of the image.

The preset descriptor database includes descriptors of a plurality of candidate points on the map. Specifically, angle information of vertical feature lines of buildings around the candidate points is stored in the database by using location coordinates of the candidate points as indexes. Optionally, the descriptor of the candidate point further includes depth information and/or height information of a vertical feature line of a surrounding building.

Figure 7:
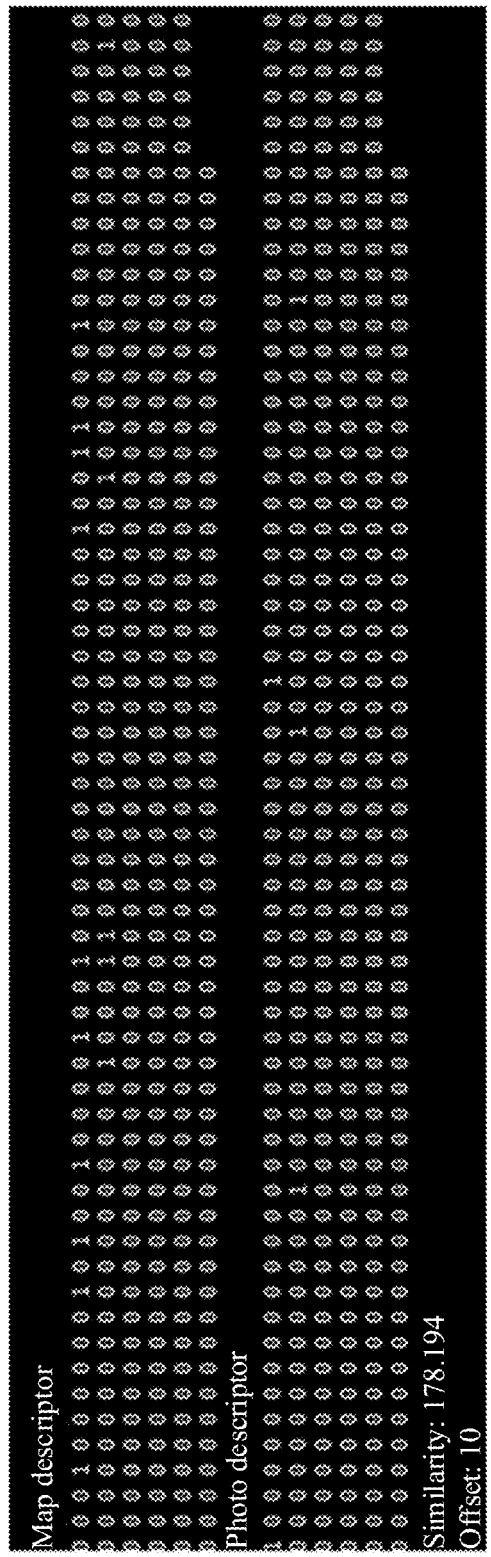
FIG. 7 is a schematic diagram of a data structure of a descriptor according to an embodiment of this application.

A descriptor may include a plurality of types of data structures. Optionally, FIG. 7 is a schematic diagram of a data structure of a descriptor according to an embodiment of this application. A 360-degree ring array is expanded into a one-dimensional array with a length of 360 by precision of 1 degree. A photo descriptor is an angle information array of a vertical contour line of a building in an image in a current coordinate system, and a location of a digit "1" represents an angle within which a vertical contour line of the building in the image can be obtained in the current coordinate system. A map descriptor in a database is an angle information array of a convex polygon vertex of the building in the ENU coordinate system, and a location of a digit "1" represents an angle of a convex polygon vertex of the building in the ENU coordinate system.

For example, "1" in a fourth bit of the map descriptor indicates that, in the ENU coordinate system, the convex polygon vertex of the building can be seen in a 4-degree orientation in a location on the current map. "1" in a first bit of the photo descriptor indicates that, in the ENU coordinate system, a vertical contour line of the building in the image can be seen in a 1 degree orientation. A location with a digit "0" indicates that no vertical feature line of a building is detected or exists in a current orientation.

Matching between an image to be located and a candidate point on the map may be directly performed based on a descriptor, to implement localization. There are a plurality of matching manners, and this is not limited herein.

Optionally, in the geometric semantic descriptor generated based on the photographed image, a spacing angle between the feature points and descriptors of candidate points are transformed onto a same 360-degree scale. However, because an azimuth of the photographing place is uncertain, angle information of the descriptors is not in a same coordinate system. A new geometric semantic descriptor with an angle offset can be formed each time geometric semantic descriptor data slides on an end-to-end circle, and then a similarity is calculated between the new geometric semantic descriptor and a geometric semantic descriptor of a candidate point on the current map. A target candidate point is determined based on calculated similarities between descriptors, and the terminal may obtain the localization information of the photographing place of the image based on a geographical location of the target candidate point.

Then, matching can be performed between the descriptors within an error range of the magnetometer.

There are a plurality of manners for calculating the similarities between the descriptors. Optionally, a geometric semantic descriptor is transformed to a frequency domain descriptor through discrete Fourier transform, to calculate a mutual power spectrum of the geometric semantic descriptor and a descriptor of a candidate point. An offset and a correlation of the geometric semantic descriptor relative to a descriptor of a specific candidate point in the geometric semantic descriptor database are obtained by using a Dirac function. Matching, localization, and calculation are performed, and an optimal angle and an optimal location are calculated, to obtain a localization result with angle information.

Optionally, if the first localization information is obtained in step 1005, the first localization information may be used to determine that a terminal is coarsely localized within the first location range, and only candidate points within the first location range may be used for descriptor matching. This can reduce a calculation amount.

Figure 8:
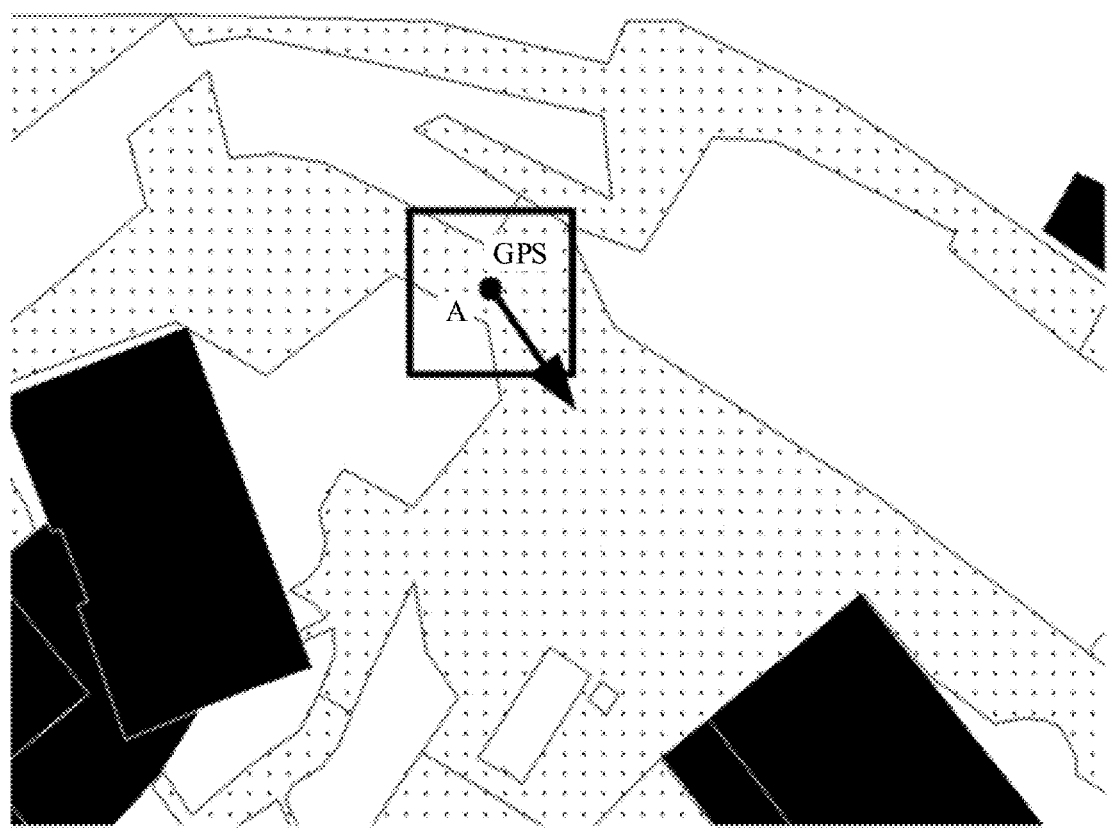
FIG. 8 is a schematic diagram of an embodiment of GPS-signal-assisted visual localization according to embodiments of this application.

For example, refer to FIG. 8. A point A in FIG. 8 represents a GPS-located point, and a block represents a first location range determined based on GPS precision information. In this step, matching may be performed between descriptors within a range of the block, that is, matching is performed between the geometric semantic descriptor of the photographed image and descriptors of all candidate points that are within the first location range and that are on the map. Optionally, when a similarity between a candidate point and a photographing place is calculated, a heat map may be drawn for scores of all candidate points within the first location range. A score represents a similarity between a candidate point and the photographing place. A sliding window of a preset size is established, the heat map is traversed, and a point having a highest comprehensive score in the sliding window is obtained as a calculated localization result.

The following describes a method for constructing an offline database in a visual localization method provided in an embodiment of this application.

Figure 9:
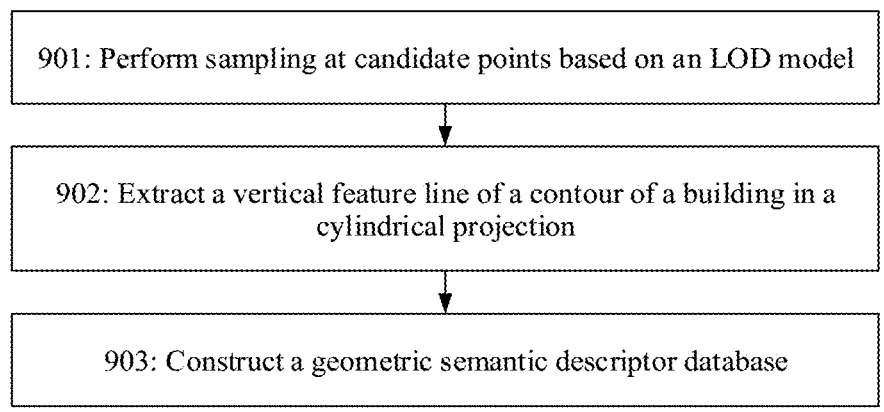
FIG. 9 is a schematic diagram of an embodiment of constructing a descriptor database according to embodiments of this application.

FIG. 9 is a schematic diagram of an embodiment of constructing a descriptor database according to the embodiments of this application.

A database construction process includes the following steps.

901: Perform Sampling at Candidate Points Based on an LOD Model.

Models of different levels of detail (LOD) may be generated based on a satellite image and a mesh simplification algorithm. For example, an LOD 0 is a top-view plane contour of a building, an LOD 1 is a three-dimensional contour of the building with height information, and an LOD 2 includes roof information of the building.

Figure 10:
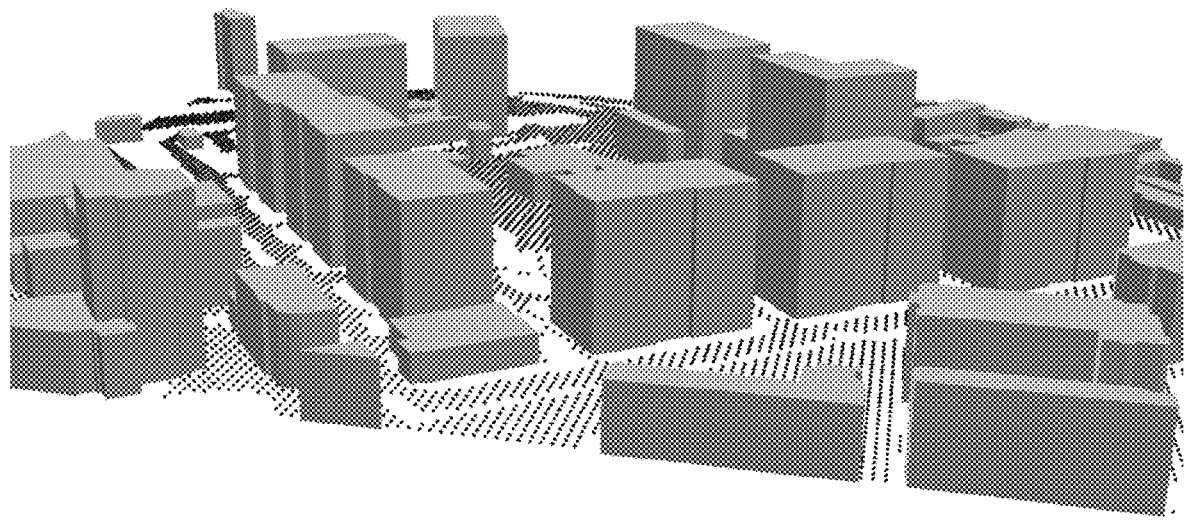
FIG. 10 is a schematic diagram of an embodiment of selecting a candidate point according to embodiments of this application.

In this embodiment, the LOD model is generated based on the satellite image, a road layer is extracted, and candidate points are selected at spacings on the road, for example, at a spacing of one meter. A specific spacing value is not limited herein. FIG. 10 is a schematic diagram of an embodiment of selecting a candidate point according to the embodiments of this application. A point on a road in the figure is a candidate point.

Figure 11:
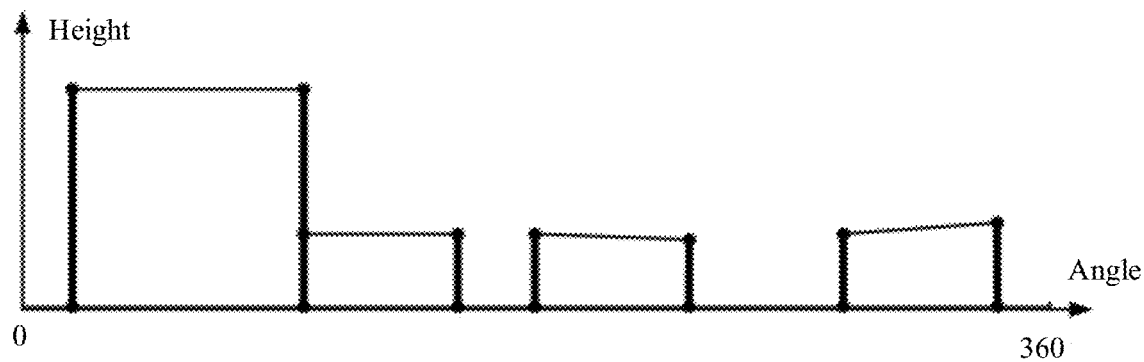
FIG. 11 is a schematic diagram of performing a cylindrical projection based on an LOD model according to an embodiment of this application.

A cylindrical projection is constructed for each candidate point, to obtain a 360-degree expanded projection result. For example, FIG. 11 is a schematic diagram of performing a cylindrical projection based on the LOD model according to this embodiment of this application, where a horizontal axis is an angle, and a vertical axis is a perspective projection height of a surrounding building. Different collection precision may be set when the cylindrical projection is constructed. For example, the precision may be set to 1 degree, 0.1 degree, or the like. This is not specifically limited herein.

902: Extract a Vertical Feature Line of a Building in the Cylindrical Projection.

Vertical contour lines of a model projection result are recognized as extracted characteristics of the geometric semantic descriptor database, and bold line segments in FIG. 11 are vertical feature lines obtained by performing a cylindrical projection on facade intersection lines of the building in the LOD model.

903: Construct the Geometric Semantic Descriptor Database.

Each candidate point on a map and a descriptor of the candidate point are recorded, and the geometric semantic descriptor database is constructed.

The descriptor is generated based on the vertical feature line obtained in step 902. The descriptor of the candidate point includes orientation angle information of a visible facade intersection line of a surrounding building using the candidate point as a reference point.

The descriptor database includes geographical locations of candidate points and descriptors of the candidate points. The descriptor of the candidate point includes orientation information of a visible facade intersection line of a surrounding building by using the candidate point as a viewpoint.

Figure 12:
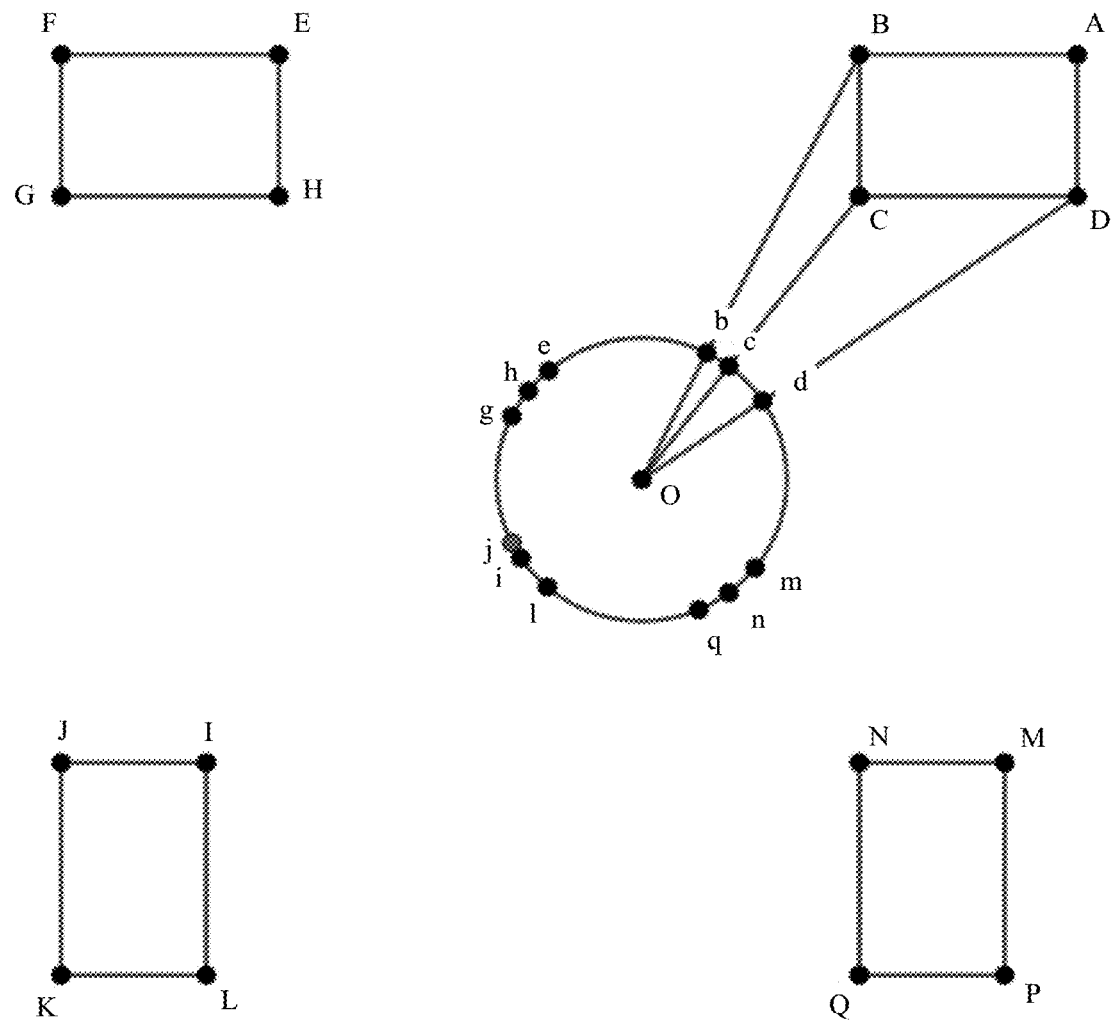
FIG. 12 is a schematic diagram of generating a descriptor of a candidate point according to an embodiment of this application.

For example, FIG. 12 is a schematic diagram of generating a descriptor of a candidate point according to an embodiment of this application.

An LOD model is projected onto a horizontal plane. Rectangles in the figure represent a building ABCD, a building EFGH, a building IJKL, and a building MNQP. For example, in the building ABCD on the upper-right corner, points A, B, C, and D represent four facade intersection lines of the building ABCD, and coordinates of each of the points are known. A point O is a selected candidate point on the map. The candidate point herein is manually specified map coordinate data. Because the map data is used as an input source, coordinates are known in advance. The candidate point O is used as an example. If a person stands at the point O, the point A of the building on the upper-right corner is blocked and invisible, points B, C, and D corresponding to the facade intersection lines of the building are visible, the points B, C, and D are separately connected to the point O. An intersection point between a unit circle in which the point O is located and a connection line connecting the point O and each of the points B, C, and D is a feature point of the geometric semantic descriptor. The feature point represents a vertical contour line of the building in a practical physical sense. In an ENU coordinate system, an included angle between the due north and a connection line between each feature point and the optical center is known. The included angle is physically an orientation in which a vertical contour line of the building is seen from the point O. Therefore, orientation angle information of the connection line between each feature point and the optical center may be obtained.

The included angle is used to describe angle information of a feature, to be used for subsequent matching and localization.

Points b, c, and d record spatial constraint information generated by a surrounding building at the point O when a user stands at the point O. Specifically, orientation angle information of a facade intersection line of the building by using the point O as a reference point is included. In addition, orientation angle information of the points b, c, and d is used as indexes, and distance information of the facade intersection lines represented by the points B, C, and D relative to the point O and height information of the facade intersection lines may be further stored.

In computer storage, a key-value structure is used to store data. A location (x, y) of the point O on the map is used as an index, and a descriptor performs sampling for a 360-degree unit circle. Typically, if sampling is performed by precision of one degree, an array including 360 pieces of data is formed. "1" is stored for an angle in which there is a feature, and "0" is stored for an angle in which there is no feature. For example, an included angle between Ob and the due north in the figure is 26.86 degrees, and "1" is recorded in 27 locations in the array.

The descriptor database may be generated by generating descriptors for all the selected candidate points on the map.

Optionally, because a distance between a candidate point and a facade intersection line of the building is known, a descriptor of the candidate point may further record depth information of each feature point.

Optionally, because a perspective projection height of a facade intersection line of the building is known, the descriptor of the candidate point may further record height information of each feature point.

Under the road constraint of the map, geometric semantic descriptors of candidate points sampled at spacings on all roads may be generated by selecting only the candidate points on the roads.

In an implementation process of the visual localization method provided in this application, descriptor matching may be performed on a terminal side, or descriptor matching may be performed on a server side. Details are described as follows.

1. A terminal side performs descriptor matching.

Figure 13:
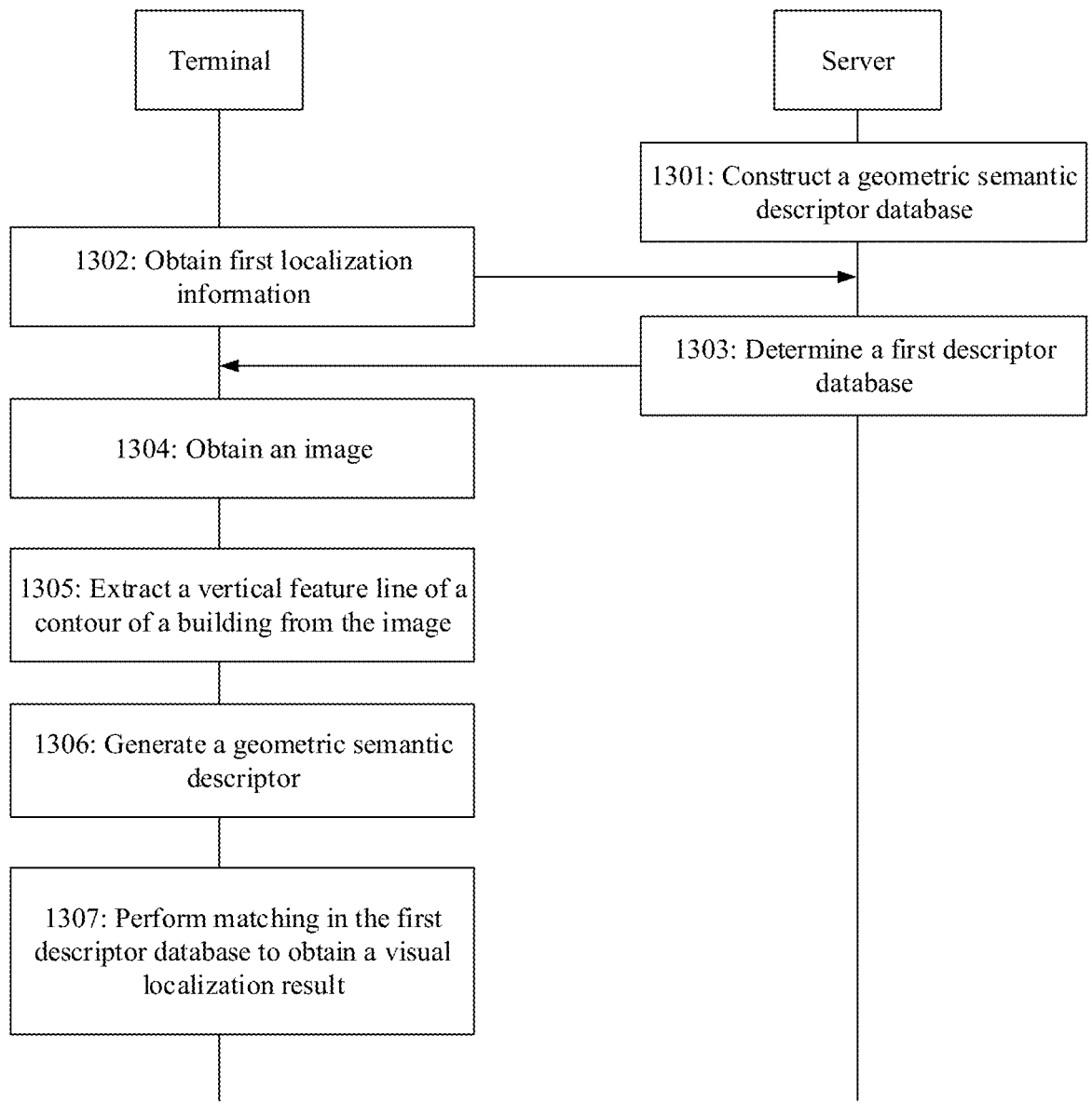
FIG. 13 is an interaction diagram of an embodiment of a visual localization method according to embodiments of this application.

FIG. 13 is an interaction diagram of an embodiment of a visual localization method according to the embodiments of this application.

1301: A server constructs a geometric semantic descriptor database.

1302: A terminal obtains first localization information, and sends the first localization information to the server.

1303: The server determines a first descriptor database and sends the first sub-database to the terminal.

1304: The terminal obtains an image.

It should be noted that an order of performing steps 1304 and 1302 is not limited. Step 1302 may be performed before step 1304, or step 1304 may be performed before step 1302.

1305: The terminal extracts a vertical feature line of a building from the image.

1306: The terminal generates a geometric semantic descriptor.

1307: The terminal performs matching in the first descriptor database to obtain a visual localization result.

For specific content of steps 1301 to 1307, refer to the embodiments corresponding to FIG. 1 and FIG. 9. Details are not described herein again.

2. A server side performs descriptor matching.

Figure 14:
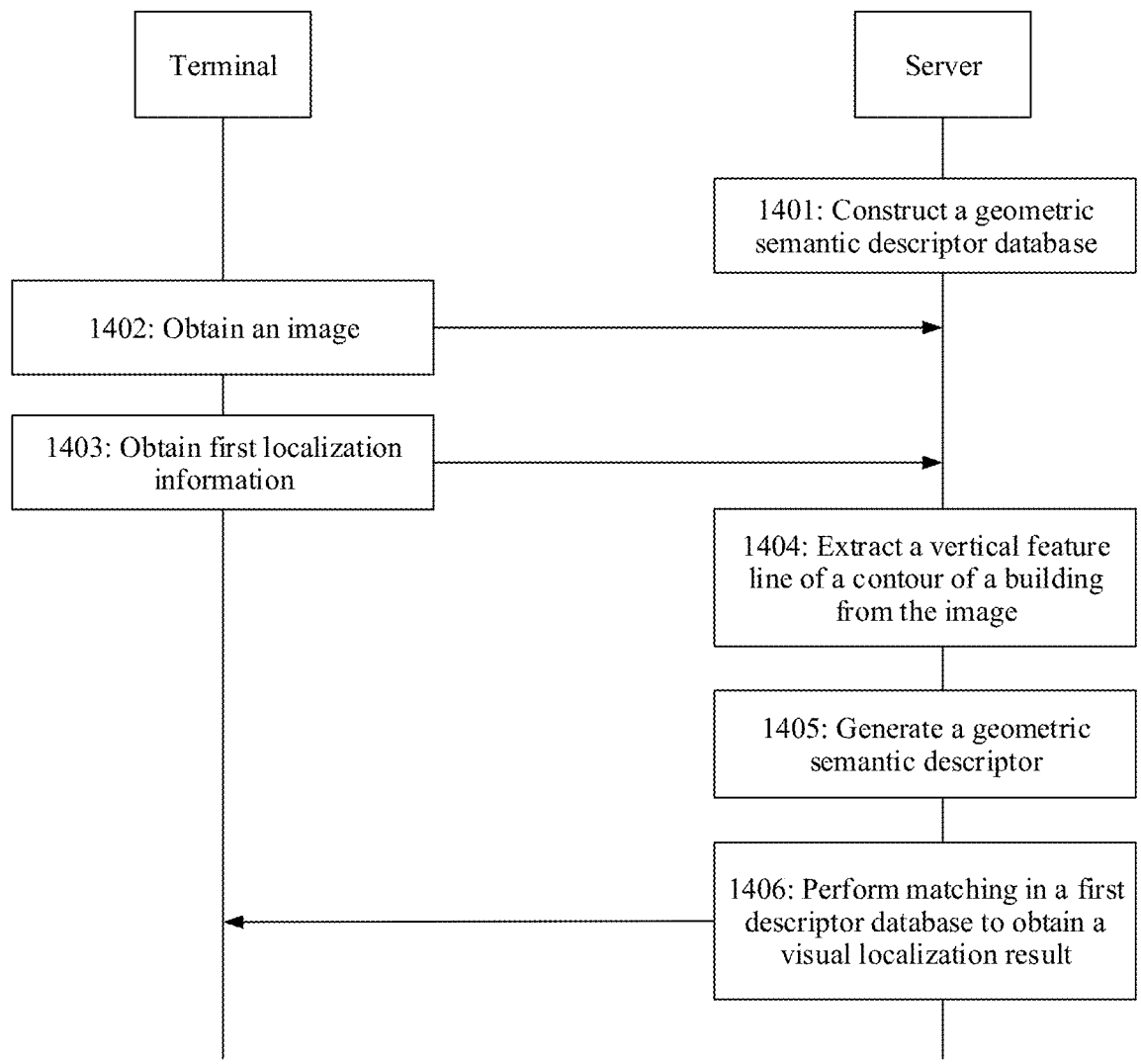
FIG. 14 is an interaction diagram of another embodiment of a visual localization method according to embodiments of this application.

FIG. 14 is an interaction diagram of another embodiment of a visual localization method according to the embodiments of this application.

1401: A server constructs a geometric semantic descriptor database.

1402: The terminal obtains an image and sends the image to the server.

1403: A terminal obtains first localization information, and sends the first localization information to the server.

It should be noted that an execution order of steps 1401 to 1403 is not limited.

1404: The server extracts a vertical feature line of a building from the image.

1405: The server generates a geometric semantic descriptor.

1406: The server performs matching in the first descriptor database, obtains a visual localization result, and sends the visual localization result to the terminal.

For specific content of steps 1401 to 1406, refer to the embodiments corresponding to FIG. 1 and FIG. 9. Details are not described herein again.

Figure 15:
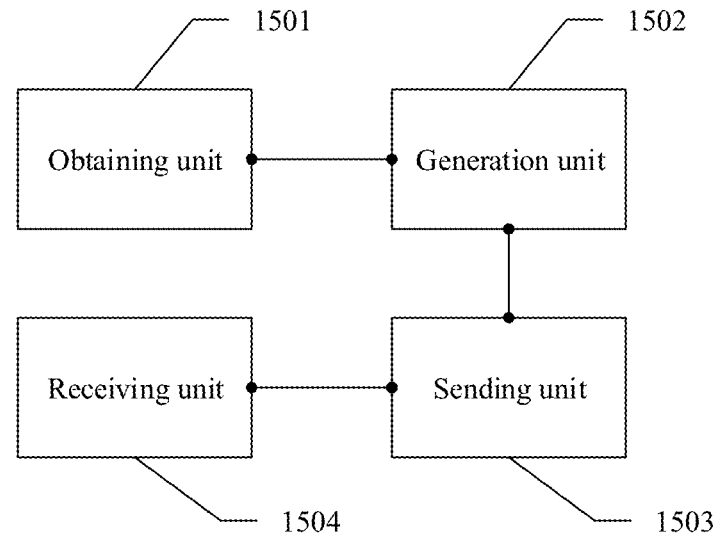
FIG. 15 is a schematic diagram of an embodiment of a terminal according to embodiments of this application.

The foregoing describes the visual localization method provided in the embodiments of this application. The following describes a terminal and a server that implement the method. FIG. 15 is a schematic diagram of an embodiment of a terminal according to the embodiments of this application.

The terminal provided in this embodiment of this application includes:

an obtaining unit 1501, configured to obtain an image of a building; and a generation unit 1502, configured to generate a descriptor based on the image, where the descriptor includes information about a horizontal viewing angle between a first vertical feature line and a second vertical feature line in the image, the first vertical feature line indicates a first facade intersection line of the building, and the second vertical feature line indicates a second facade intersection line of the building.

The obtaining unit 1501 is further configured to perform matching in a preset descriptor database based on the descriptor, to obtain localization information of a photographing place of the image.

Optionally, the generation unit 1502 is specifically configured to: extract the first vertical feature line and the second vertical feature line of the building from the image; and generate the descriptor based on a location relationship between the first vertical feature line and the second vertical feature line, where the location relationship includes the information about the horizontal viewing angle between the first vertical feature line and the second vertical feature line.

Optionally, the descriptor includes height information and/or depth information of the first vertical feature line, and height information and/or depth information of the second vertical feature line. The height information of the first vertical feature line is used to indicate a height of the first facade intersection line, the height information of the second vertical feature line is used to indicate a height of the second facade intersection line, the depth information of the first vertical feature line is used to indicate a distance from the photographing place of the image to the first facade intersection line, and the depth information of the second vertical feature line is used to indicate a distance from the photographing place of the image to the second facade intersection line.

Optionally, the descriptor is expressed by using a ring array. The ring array includes first data indicating the first vertical feature line and second data indicating the second vertical feature line, and a location spacing between the first data and the second data in the ring array is used to indicate the information about the horizontal viewing angle between the first vertical feature line and the second vertical feature line.

Optionally, the descriptor is expressed by using the ring array. The ring array includes the first data, the second data, and third data. The third data is used to indicate that no vertical feature line of the building appears.

Optionally, the first data includes the height information and/or the depth information of the first vertical feature line, and the second data includes the height information and/or the depth information of the second vertical feature line.

Optionally, the descriptor is expressed by using a circle, a first feature point that is on the circle and that indicates the first vertical feature line, and a second feature point that is on the circle and that indicates the second vertical feature line. The circle uses an optical center corresponding to the image as a circle center. The first feature point is a point obtained by projecting the first vertical feature line onto a cylinder that uses a gravity axis passing through the optical center as an axis, and then projecting the first vertical feature line onto a horizontal plane including the optical center. The second feature point is a point obtained by projecting the second vertical feature line onto the cylinder, and then projecting the second vertical feature line onto the horizontal plane. An included angle between a connection line between the first feature point and the circle center, and a connection line between the second feature point and the circle center is used to indicate the information about the horizontal viewing angle.

Optionally, the preset descriptor database includes geographical locations of candidate points and descriptors of the candidate points. The descriptor of the candidate point includes orientation information of a visible facade intersection line of a surrounding building by using the candidate point as a viewpoint.

Optionally, the obtaining unit 1501 is further configured to obtain first localization information. The first localization information includes localization information obtained based on a GPS signal, a Wi-Fi signal, location information of a base station serving the terminal, or localization information obtained by manually entering an address by a user. The obtaining unit 1501 is specifically configured to perform matching in a first descriptor database based on the descriptor, to obtain the localization information. The first descriptor database includes a geographical location of a first candidate point and a descriptor of the first candidate point, and the first candidate point is a candidate point whose geographical location falls within a first location range corresponding to the first localization information.

Optionally, the obtaining unit 1501 is further configured to obtain the first localization information. The first localization information includes the localization information obtained based on the GPS signal, the Wi-Fi signal, the location information of the base station serving the terminal, or the localization information obtained by manually entering the address by the user.

The terminal further includes:
a sending unit 1503, configured to send the first localization information to a server; and
a receiving unit 1504, configured to receive the preset descriptor database sent by the server, where the preset descriptor database includes the geographical location of the first candidate point and the descriptor of the first candidate point, and the first candidate point is the candidate point whose geographical location falls within the first location range corresponding to the first localization information.

Optionally, the obtaining unit 1501 is further configured to obtain photographing orientation information of the image.

The obtaining unit 1501 is specifically configured to perform matching in the preset descriptor database based on the descriptor and a first angle range determined by using the photographing orientation information, to obtain the localization information.

Optionally, the obtaining unit 1501 is specifically configured to obtain a first image photographed in a first place and a second image photographed in a second place. The first place and the second place are a same place, or a distance between the first place and the second place is less than a preset threshold, and the first image and the second image include partially overlapping image information.

Optionally, the preset descriptor database is generated based on a satellite image.

Figure 16:
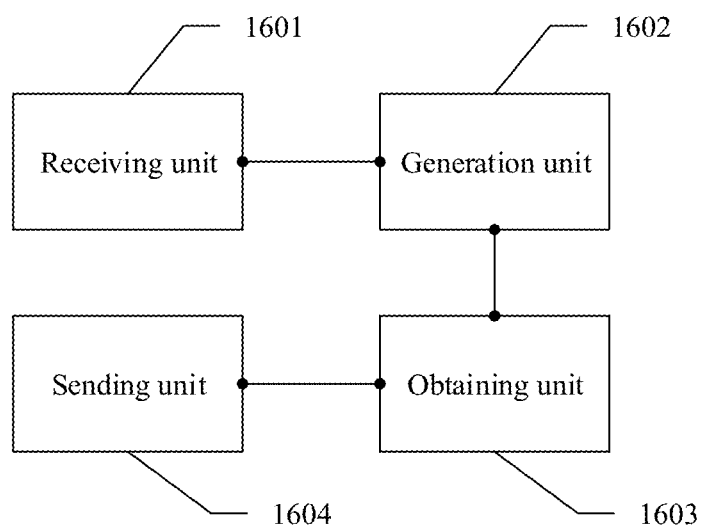
FIG. 16 is a schematic diagram of an embodiment of a server according to embodiments of this application.

FIG. 16 is a schematic diagram of an embodiment of a server according to the embodiments of this application.

The server provided in this embodiment of this application includes:
a receiving unit 1601, configured to receive an image of a building sent by a terminal;
a generation unit 1602, configured to generate a descriptor based on the image, where the descriptor includes information about a horizontal viewing angle between a first vertical feature line and a second vertical feature line in the image, the first vertical feature line indicates a first facade intersection line of the building, and the second vertical feature line indicates a second facade intersection line of the building;
an obtaining unit 1603, configured to perform matching in a preset descriptor database based on the descriptor, to obtain localization information of a photographing place of the image; and
a sending unit 1604, configured to send the localization information to the terminal.

Optionally, the generation unit 1602 is specifically configured to: extract the first vertical feature line and the second vertical feature line of the building from the image; and generate the descriptor based on a location relationship between the first vertical feature line and the second vertical feature line, where the location relationship includes the information about the horizontal viewing angle between the first vertical feature line and the second vertical feature line.

Optionally, the descriptor includes height information and/or depth information of the first vertical feature line, and height information and/or depth information of the second vertical feature line. The height information of the first vertical feature line is used to indicate a height of the first facade intersection line, the height information of the second vertical feature line is used to indicate a height of the second facade intersection line, the depth information of the first vertical feature line is used to indicate a distance from the photographing place of the image to the first facade intersection line, and the depth information of the second vertical feature line is used to indicate a distance from the photographing place of the image to the second facade intersection line.

Optionally, the descriptor is expressed by using a ring array. The ring array includes first data indicating the first vertical feature line and second data indicating the second vertical feature line, and a location spacing between the first data and the second data in the ring array is used to indicate the information about the horizontal viewing angle between the first vertical feature line and the second vertical feature line.

Optionally, the descriptor is expressed by using the ring array. The ring array includes the first data, the second data, and third data. The third data is used to indicate that no vertical feature line of the building appears.

Optionally, the first data includes the height information and/or the depth information of the first vertical feature line, and the second data includes the height information and/or the depth information of the second vertical feature line.

Optionally, the descriptor is expressed by using a circle, a first feature point that is on the circle and that indicates the first vertical feature line, and a second feature point that is on the circle and that indicates the second vertical feature line. The circle uses an optical center corresponding to the image as a circle center. The first feature point is a point obtained by projecting the first vertical feature line onto a cylinder that uses a gravity axis passing through the optical center as an axis, and then projecting the first vertical feature line onto a horizontal plane including the optical center. The second feature point is a point obtained by projecting the second vertical feature line onto the cylinder, and then projecting the second vertical feature line onto the horizontal plane. An included angle between a connection line between the first feature point and the circle center, and a connection line between the second feature point and the circle center is used to indicate the information about the horizontal viewing angle.

Optionally, the preset descriptor database includes geographical locations of candidate points and descriptors of the candidate points. The descriptor of the candidate point includes orientation information of a visible facade intersection line of a surrounding building by using the candidate point as a viewpoint.

Optionally, the obtaining unit 1603 is further configured to obtain first localization information sent by the terminal. The first localization information includes localization information obtained based on a GPS signal, a Wi-Fi signal, location information of a base station serving the terminal, or localization information obtained by manually entering an address by a user.

Optionally, the obtaining unit 1603 is specifically configured to perform matching in a first descriptor database based on the descriptor, to obtain the localization information. The first descriptor database includes a geographical location of a first candidate point and a descriptor of the first candidate point, and the first candidate point is a candidate point whose geographical location falls within a first location range corresponding to the first localization information.

Optionally, the obtaining unit 1603 is further configured to obtain photographing orientation information of the image sent by the terminal.

The obtaining unit 1603 is specifically configured to perform matching in the preset descriptor database based on the descriptor and a first angle range determined by using the photographing orientation information, to obtain the localization information.

Optionally, the receiving unit 1601 is specifically configured to receive a first image photographed in a first place and a second image photographed in a second place. The first place and the second place are a same place, or a distance between the first place and the second place is less than a preset threshold, and the first image and the second image include partially overlapping image information.

Optionally, the preset descriptor database is generated based on a satellite image.

Figure 17:
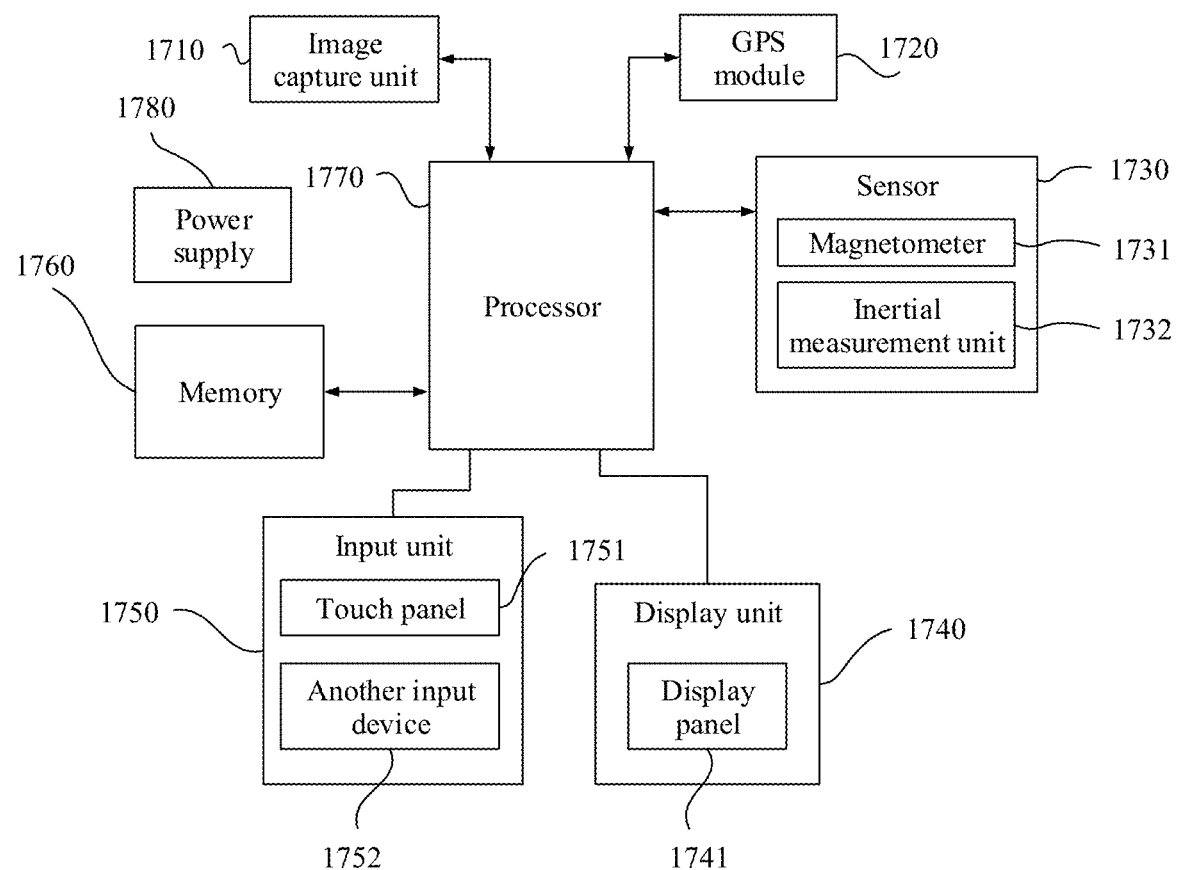
FIG. 17 is a schematic diagram of another embodiment of a terminal according to embodiments of this application.

FIG. 17 is a schematic diagram of another embodiment of a terminal according to the embodiments of this application.

FIG. 17 is a block diagram of a partial structure of the terminal according to this embodiment of this application. The terminal includes components such as an image capture unit 1710, a global positioning system (GPS) module 1720, a sensor 1730, a display unit 1740, an input unit 1750, a memory 1760, a processor 1770, and a power supply 1780. A person skilled in the art may understand that the terminal structure shown in FIG. 17 does not constitute any limitation on the terminal. The terminal may include more or fewer components than those shown in the figure, or combine some components, or have different component deployment.

The following describes each constituent part of the terminal in detail with reference to FIG. 17.

The image capture unit 1710 is configured to capture an image, and is configured to capture an image of a building in this embodiment of this application. The image capture unit 1710 may be, for example, a monocular camera, a binocular camera, a depth camera, or a laser radar. A specific type of the image capture unit is not limited herein.

The GPS module 1720 provides localization or navigation for a user based on a global navigation satellite system. Compared with visual localization, the GPS module 1720 has lower precision. The GPS module 1720 may be configured to assist localization in the embodiments of this application.

The terminal may further include at least one sensor 1730, for example, a magnetometer 1731 and an inertial measurement unit (IMU) 1732. The inertial measurement unit is an apparatus for measuring a three-axis attitude angle (or an angular rate) and acceleration of an object. Generally, one IMU includes three single-axis accelerometers and three single-axis gyroscopes. The accelerometer detects acceleration signals of the object on three independent axes of a carrier coordinate system, and the gyroscope detects angular velocity signals of a carrier relative to a navigation coordinate system. An angular velocity and acceleration of the object in three-dimensional space are measured, and an attitude of the object is calculated based on the measured angular velocity and acceleration. To improve reliability, each axis may be further equipped with more sensors. In addition, the terminal may further include a vibration recognition related function (for example, a pedometer or a knock), and the like. In addition, a light sensor, a motion sensor, and other sensors may be further included. Specifically, the light sensor may include an ambient light sensor and a proximity sensor. The ambient light sensor may adjust brightness of a display panel 1741 based on brightness of ambient light, and the proximity sensor may turn off the display panel 1741 and/or backlight when the terminal is moved to an ear. For other sensors such as a gyroscope, a barometer, a hygrometer, a thermometer, and an infrared sensor that may be further configured on the terminal, details are not described herein.

The display unit 1740 may be configured to display information entered by a user or information provided for the user, and various menus of the terminal. The display unit 1740 may include the display panel 1741. Optionally, the display panel 1741 may be configured in a form of a liquid crystal display (LCD), an organic light-emitting diode (OLED), or the like. Further, a touch panel 1751 may cover the display panel 1741. When detecting a touch operation on or near the touch panel 1751, the touch panel 1751 transmits the touch operation to the processor 1770 to determine a type of a touch event. Then the processor 1770 provides corresponding visual output on the display panel 1741 based on the type of the touch event. Although in FIG. 17, the touch panel 1751 and the display panel 1741 are used as two independent components to implement input and output functions of the terminal, in some embodiments, the touch panel 1751 and the display panel 1741 may be integrated to implement the input and output functions of the terminal.

The input unit 1750 may be configured to receive entered digit or character information, and generate a key signal input related to a user setting and function control of the terminal. Specifically, the input unit 1750 may include the touch panel 1751 and another input device 1752. The touch panel 1751, also referred to as a touchscreen, may collect a touch operation (for example, an operation performed by the user on or near the touch panel 1751 by using any proper object or accessory such as a finger or a stylus) performed by the user on or near the touch panel 1751, and drive a corresponding connection apparatus based on a preset program. Optionally, the touch panel 1751 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, sends the contact coordinates to the processor 1770, and can receive and execute a command sent by the processor 1770. In addition, the touch panel 1751 may be implemented in a plurality of types, such as a resistive type, a capacitive type, an infrared type, and a surface acoustic wave type. In addition to the touch panel 1751, the input unit 1750 may further include the another input device 1752. Specifically, the another input device 1752 may include but is not limited to one or more of a physical keyboard, a function key (for example, a volume control press key or an on/off press key), a trackball, a mouse, a joystick, and the like.

The memory 1760 may be configured to store a software program and module. The processor 1770 runs the software program and/or module that are stored in the memory 1760, to perform various function applications of the terminal and process data. The memory 1760 may mainly include a program storage area and a data storage area. The program storage area may store an operating system, an application required for at least one function (such as a voice playing function and an image playing function), and the like. The data storage area may store data (such as audio data and an address book) created according to use of the terminal, and the like. In addition, the memory 1760 may include a high-speed random access memory, and may further include a non-volatile memory, for example, at least one magnetic disk storage device, a flash memory device, or another volatile solid-state storage device.

The processor 1770 is a control center of the terminal, and connects all parts of the entire terminal through various interfaces and lines. By running or executing the software program and/or module stored in the memory 1760 and invoking data stored in the memory 1760, the processor 1770 performs various functions of the terminal and process data, to perform overall monitoring on the terminal. Optionally, the processor 1770 may include one or more processing units. Preferably, an application processor and a modem processor may be integrated into the processor 1770. The application processor mainly processes an operating system, a user interface, an application, and the like. The modem processor mainly processes wireless communication. It may be understood that the modem processor may alternatively not be integrated into the processor 1770.

The terminal further includes the power supply 1780 (such as a battery) that supplies power to the components. Preferably, the power supply may be logically connected to the processor 1770 by using a power supply management system, so that the power supply management system is used to implement functions, such as charging, discharging, and power consumption management.

Although not shown, optionally, the terminal may include an audio circuit. The audio circuit includes a speaker and a microphone, and may provide an audio interface between the user and the terminal.

Although not shown in the figure, optionally, the terminal may include a wireless fidelity (Wi-Fi) module. Wi-Fi is a short-range wireless transmission technology. The terminal may help, by using the Wi-Fi module, the user send and receive an email, browse a web page, access streaming media, and the like. The Wi-Fi module provides wireless broadband Internet access for the user.

Although not shown, optionally, the terminal may further include a radio frequency (RF) circuit.

Although not shown in the figure, the terminal may further include a Bluetooth module, and the like. Details are not described herein.

In this embodiment of this application, the processor 1770 included in the terminal further has a function of implementing the foregoing visual localization methods.

Figure 18:
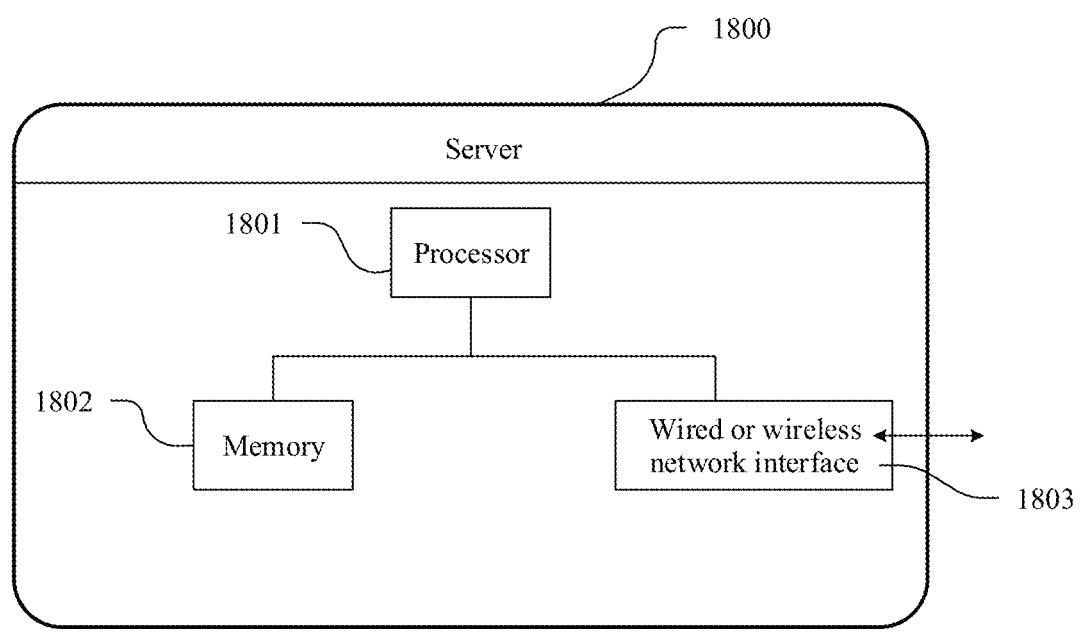
FIG. 18 is a schematic diagram of another embodiment of a server according to embodiments of this application.

FIG. 18 is a schematic diagram of another embodiment of a server according to the embodiments of this application. The server provided in this embodiment is a destination server specific for live migration of a virtual machine. A specific device form of the server is not limited in this embodiment of this application.

The server 1800 may differ greatly due to different configurations or performance, and may include one or more processors 1801 and memories 1802. The memory 1802 stores a program or data.

The memory 1802 may be a volatile memory or a non-volatile memory. Optionally, the processor 1801 is one or more central processing units (CPU), and the CPU may be a single-core CPU or a multi-core CPU. The processor 1801 may communicate with the memory 1802, and execute a series of instructions in the memory 1802 on the server 1800.

The server 1800 further includes one or more wired or wireless network interfaces 1803, such as Ethernet interfaces.

Optionally, although not shown in FIG. 18, the server 1800 may further include one or more power supplies and one or more input/output interfaces. The input/output interface may be configured to connect to a display, a mouse, a keyboard, a touchscreen device, a sensor device, or the like.

The input/output interface is an optional component, and may or may not exist. This is not limited herein.

For a procedure performed by the processor 1801 in the server 1800 in this embodiment, refer to the method procedures described in the foregoing method embodiments. Details are not described herein again.

Figure 19:
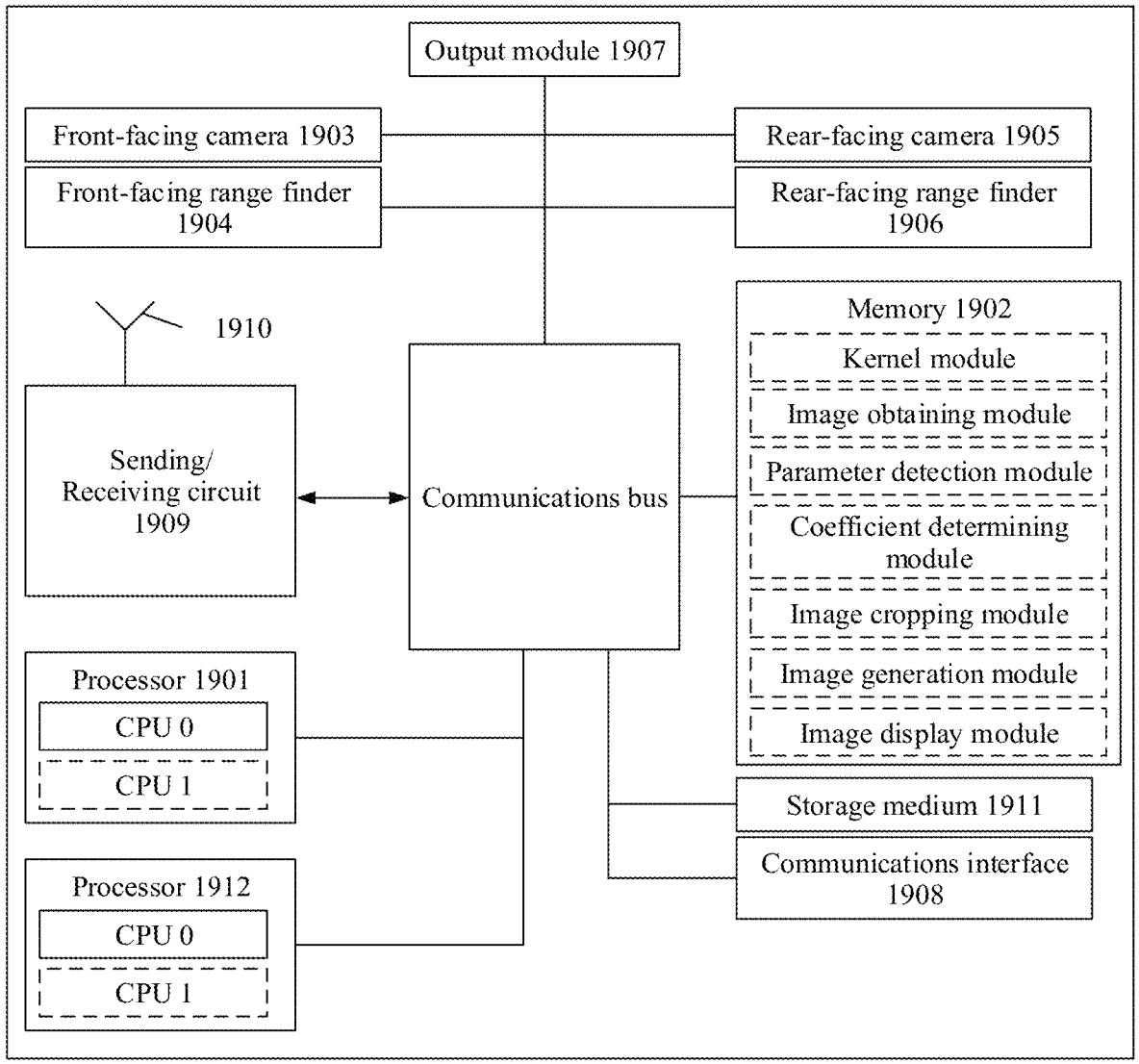
FIG. 19 is a schematic structural diagram of an AR device according to an embodiment of this application.

The foregoing terminal may alternatively be an augmented reality (AR) device. FIG. 19 is a schematic structural diagram of an AR device according to an embodiment of this application.

As shown in FIG. 19, the AR device includes a processor 1901. The processor 1901 may be coupled to one or more storage media. The storage media include a storage medium 1911 and at least one memory 1902. The storage medium 1911 may be read-only, for example, a read-only memory (ROM), a readable/writable hard disk, or a flash memory. The memory 1902 may be, for example, a random access memory (RAM). The memory 1902 may be combined with the processor 1901, may be integrated into the processor 1901, or may include one independent unit or a plurality of units. The processor 1901 is a control center of the AR device, and specifically provides a time sequence and a process device that are used to execute instructions, complete an interrupt event, and provide a time function and many other functions. Optionally, the processor 1901 includes one or more central processing units (CPUs), such as a CPU 0 and a CPU 1 in FIG. 19. Optionally, the AR device may further include a plurality of processors, and each processor may be single-core or multi-core. Unless otherwise specified, a specific implementation of the processor or the memory described in this application includes a general-purpose component or a dedicated component, the general-purpose component is configured to execute a specific task at a specific moment, and the dedicated component is produced to execute a dedicated task. The processor described in this embodiment of this application includes at least one electronic device, a circuit, and/or a processor chip configured to process data (for example, computer program instructions). Program code executed by the processor 1901 and/or the processor 1912 or a single CPU in the processor 1901 and/or the processor 1912 may be stored in the memory 1902.

Further, the AR device further includes a front-facing camera 1903, a front-facing range finder 1904, a rear-facing camera 1905, a rear-facing range finder 1906, an output module 1907 (for example, an optical projector or a laser projector), and/or a communications interface 1908. The front-facing camera 1903, the front-facing range finder 1904, the rear-facing camera 1905, the rear-facing range finder 1906, and the output module 1907 are coupled to the processor 1901. In addition, the AR device may further include a receiving/sending circuit 1909 and an antenna 1910. The receiving/sending circuit 1909 and the antenna 1910 are configured to implement a connection between the AR device and an external network. Composition units of the AR device may be coupled to each other through a communications buses, and the communications bus includes at least any one of the following: a data bus, an address bus, a control bus, an extended bus, and a local bus. It should be noted that the AR device is merely an example entity apparatus form disclosed in this embodiment of this application, and a specific form of the AR device is not uniquely limited in this embodiment of this application.

The processor 1901 of the AR device can be coupled to the at least one memory 1902, the memory 1902 prestores program code, and the program code specifically includes an image obtaining module, a parameter detection module, a coefficient determining module, an image cropping module, an image generation module, and an image display module. The memory 1902 further stores a kernel module, and the kernel module includes an operating system (for example, WINDOWS™, ANDROID™, and IOS™).

The processor 1901 of the AR device is configured to invoke the program code, to perform the localization method in the embodiments of this application.

It may be clearly understood by a person skilled in the art that, for convenient and brief description, for a detailed working process of the foregoing system, apparatus, and unit, refer to a corresponding process in the foregoing method embodiments. Details are not described herein again.

In the embodiments provided in this application, it should be understood that, the disclosed system, apparatus, and method may be implemented in other manners. For example, the foregoing described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communications connection may be implemented through some interfaces. The indirect couplings or communications connection between the apparatuses or units may be implemented in electrical, mechanical, or other forms.

The units described as separate parts may or may not be physically separate, and parts displayed as units may or may not be physical units, may be located in one place, or may be distributed onto a plurality of network units. Some or all of the units may be selected based on actual requirements to achieve the objectives of the solutions of the embodiments.

In addition, the functional units in the embodiments of this application may be integrated into one processing unit, or each of the units may exist alone physically, or two or more of the units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A visual localization method, comprising:
   obtaining, by a terminal device, an image of a building;
   generating, by the terminal device, a descriptor based on the image, wherein the descriptor comprises information about a horizontal viewing angle between a first vertical feature line and a second vertical feature line in the image, the first vertical feature line indicates a first facade intersection line of the building, and the second vertical feature line indicates a second facade intersection line of the building; and
   performing, by the terminal device, matching in a preset descriptor database based on the descriptor, to obtain localization information of a photographing place of the image, wherein the preset descriptor database comprises geographical locations of candidate points and descriptors of the candidate points, wherein each of the descriptors of the candidate points comprises orientation information of a visible facade intersection line of a surrounding building by using the corresponding candidate point as a viewpoint, and wherein a geographical location of a candidate point indicated by a descriptor that is in the preset descriptor database and that matches the descriptor of the image is the localization information of the photographing place of the image.

2. The method according to claim 1, wherein generating the descriptor comprises:
   extracting, by the terminal device, the first vertical feature line and the second vertical feature line of the building from the image; and
   generating, by the terminal device, the descriptor based on a location relationship between the first vertical feature line and the second vertical feature line, wherein the location relationship comprises the information about the horizontal viewing angle between the first vertical feature line and the second vertical feature line.

3. The method according to claim 1, wherein the descriptor comprises:
   at least one of height information or depth information of the first vertical feature line and at least one of height information or depth information of the second vertical feature line, wherein the height information of the first vertical feature line indicates a height of the first facade intersection line, the height information of the second vertical feature line indicates a height of the second facade intersection line, the depth information of the first vertical feature line indicates a distance from the photographing place of the image to the first facade intersection line, and the depth information of the second vertical feature line indicates a distance from the photographing place of the image to the second facade intersection line.

4. The method according to claim 1, wherein the descriptor is expressed by using a ring array, wherein the ring array comprises first data indicating the first vertical feature line and second data indicating the second vertical feature line, and wherein a location spacing between the first data and the second data in the ring array indicates the information about the horizontal viewing angle between the first vertical feature line and the second vertical feature line.

5. The method according to claim 4, wherein the descriptor is expressed by using the ring array, wherein the ring array comprises the first data, the second data, and third data, and wherein the third data indicates that no vertical feature line of the building appears.

6. The method according to claim 4, wherein the first data comprises at least one of height information or depth information of the first vertical feature line, and the second data comprises at least one of height information or depth information of the second vertical feature line.

7. The method according to claim 1, wherein
   the descriptor is expressed by using a circle, a first feature point on the circle indicating the first vertical feature line, and a second feature point on the circle indicating the second vertical feature line, wherein the circle uses an optical center corresponding to the image as a circle center;
   the first feature point is obtained by:
      projecting the first vertical feature line onto a cylinder that uses a gravity axis passing through the optical center as an axis; and
      projecting the first vertical feature line onto a horizontal plane comprising the optical center;
   the second feature point is obtained by:
      projecting the second vertical feature line onto the cylinder; and
      projecting the second vertical feature line onto the horizontal plane; and
   an included angle between a connection line between the first feature point and the circle center, and a connection line between the second feature point and the circle center indicating the information about the horizontal viewing angle.

8. The method according to claim 1, wherein the method further comprises:
   obtaining, by the terminal device, first localization information, wherein the first localization information comprises localization information obtained based on a GPS signal, a Wi-Fi signal, location information of a base station serving the terminal device, or localization information obtained by manually entering an address by a user; and wherein
   performing matching in the preset descriptor database comprises:
      performing, by the terminal device, matching in a first descriptor database based on the descriptor, to obtain the localization information, wherein the first descriptor database comprises a geographical location of a first candidate point and a descriptor of the first candidate point, and the first candidate point is a candidate point whose geographical location falls within a first location range corresponding to the first localization information.

9. The method according to claim 1, wherein the method further comprises:
   obtaining, by the terminal device, first localization information, wherein the first localization information comprises the localization information obtained based on a GPS signal, a Wi-Fi signal, location information of a base station serving the terminal device, or a localization information obtained by manually entering an address by a user;
   sending, by the terminal device, the first localization information to a server; and
   receiving, by the terminal device, the preset descriptor database sent by the server, wherein the preset descriptor database comprises the geographical location of a first candidate point and the descriptor of the first candidate point, and the first candidate point is the candidate point whose geographical location falls within a first location range corresponding to the first localization information.

10. The method according to claim 1, wherein the method further comprises: obtaining, by the terminal device, photographing orientation information of the image; and wherein performing matching in the preset descriptor database comprises: performing, by the terminal device, matching in the preset descriptor database further based on a first angle range determined based on the photographing orientation information, to obtain the localization information.

11. A visual localization method, comprising:
receiving, by a server, an image of a building sent by a terminal device;
generating, by the server, a descriptor based on the image, wherein the descriptor comprises information about a horizontal viewing angle between a first vertical feature line and a second vertical feature line in the image, the first vertical feature line indicates a first facade intersection line of the building, and the second vertical feature line indicates a second facade intersection line of the building;
performing, by the server, matching in a preset descriptor database based on the descriptor, to obtain localization information of a photographing place of the image, wherein the preset descriptor database comprises geographical locations of candidate points and descriptors of the candidate points, wherein each of the descriptors of the candidate points comprises orientation information of a visible facade intersection line of a surrounding building by using the corresponding candidate point as a viewpoint, and wherein a geographical location of a candidate point indicated by a descriptor that is in the preset descriptor database and that matches the descriptor of the image is the localization information of the photographing place of the image; and
sending, by the server, the localization information to the terminal device.

12. The method according to claim 11, wherein generating the descriptor comprises:
extracting, by the server, the first vertical feature line and the second vertical feature line of the building from the image; and
generating, by the server, the descriptor based on a location relationship between the first vertical feature line and the second vertical feature line, wherein the location relationship comprises the information about the horizontal viewing angle between the first vertical feature line and the second vertical feature line.

13. The method according to claim 11, wherein the descriptor comprises:
at least one of height information or depth information of the first vertical feature line and at least one of height information or depth information of the second vertical feature line, wherein the height information of the first vertical feature line indicates a height of the first facade intersection line, the height information of the second vertical feature line indicates a height of the second facade intersection line, the depth information of the first vertical feature line indicates a distance from the photographing place of the image to the first facade intersection line, and the depth information of the second vertical feature line indicates a distance from the photographing place of the image to the second facade intersection line.

14. The method according to claim 11, wherein
the descriptor is expressed by using a ring array, wherein the ring array comprises first data indicating the first vertical feature line and second data indicating the second vertical feature line, and wherein a location spacing between the first data and the second data in the ring array indicates the information about the horizontal viewing angle between the first vertical feature line and the second vertical feature line.

15. The method according to claim 14, wherein the descriptor is expressed by using the ring array, wherein the ring array comprises the first data, the second data, and third data, and wherein the third data indicates that no vertical feature line of the building appears.

16. The method according to claim 14, wherein the first data comprises at least one of height information or depth information of the first vertical feature line, and the second data comprises at least one of height information or depth information of the second vertical feature line.

17. The method according to claim 11, wherein
the descriptor is expressed by using a circle, a first feature point on the circle indicating the first vertical feature line, and a second feature point on the circle indicating the second vertical feature line, wherein the circle uses an optical center corresponding to the image as a circle center;
the first feature point is obtained by:
projecting the first vertical feature line onto a cylinder that uses a gravity axis passing through the optical center as an axis; and
projecting the first vertical feature line onto a horizontal plane comprising the optical center;
the second feature point is obtained by:
projecting the second vertical feature line onto the cylinder; and
projecting the second vertical feature line onto the horizontal plane; and
an included angle between a connection line between the first feature point and the circle center, and a connection line between the second feature point and the circle center indicating the information about the horizontal viewing angle.

18. The method according to claim 11, wherein the method further comprises:
obtaining, by the server, first localization information sent by the terminal device, wherein the first localization information comprises localization information obtained based on a GPS signal, a Wi-Fi signal, location information of a base station serving the terminal device, or localization information obtained by manually entering an address by a user; and wherein
performing matching in the preset descriptor database comprises:
performing, by the server, matching in a first descriptor database based on the descriptor, to obtain the localization information, wherein the first descriptor database comprises a geographical location of a first candidate point and a descriptor of the first candidate point, and the first candidate point is a candidate point whose geographical location falls within a first location range corresponding to the first localization information.

19. The method according to claim 11, wherein the method further comprises: obtaining, by the server, photographing orientation information of the image sent by the terminal device; and wherein performing matching in the preset descriptor database comprises: performing, by the terminal device, matching in the preset descriptor database further based on a first angle range determined based on the photographing orientation information, to obtain the localization information.

20. A terminal device, comprising at least one processor; and one or more memories coupled to the at least one processor and storing programming instructions for execution by the at least one processor to cause the terminal device to:
- obtain, by the terminal device, an image of a building;
- generate, by the terminal device, a descriptor based on the image, wherein the descriptor comprises information about a horizontal viewing angle between a first vertical feature line and a second vertical feature line in the image, the first vertical feature line indicates a first facade intersection line of the building, and the second vertical feature line indicates a second facade intersection line of the building; and
- perform, by the terminal device, matching in a preset descriptor database based on the descriptor, to obtain localization information of a photographing place of the image, wherein the preset descriptor database comprises geographical locations of candidate points and descriptors of the candidate points, wherein each of the descriptors of the candidate points comprises orientation information of a visible facade intersection line of a surrounding building by using the corresponding candidate point as a viewpoint, and wherein a geographical location of a candidate point indicated by a descriptor that is in the preset descriptor database and that matches the descriptor of the image is the localization information of the photographing place of the image.

* * * * *